(12) United States Patent
Goncze

(10) Patent No.: US 7,913,926 B2
(45) Date of Patent: Mar. 29, 2011

(54) THERMOSTATIC MIXING VALVE

(75) Inventor: Zoltan Goncze, Sandown, NH (US)

(73) Assignee: Watts Water Technologies, Inc., North Andover, MA (US)

( * ) Notice: Subject to any disclaimer, the term of this patent is extended or adjusted under 35 U.S.C. 154(b) by 605 days.

(21) Appl. No.: 12/011,902

(22) Filed: Jan. 30, 2008

(65) Prior Publication Data

US 2008/0191043 A1 Aug. 14, 2008

Related U.S. Application Data

(63) Continuation-in-part of application No. 11/357,149, filed on Feb. 17, 2006, now abandoned.

(60) Provisional application No. 60/887,531, filed on Jan. 31, 2007.

(51) Int. Cl.
*G05D 23/13* (2006.01)
*G05D 23/185* (2006.01)

(52) U.S. Cl. .................. 236/12.2; 236/12.11; 236/12.16

(58) Field of Classification Search ................. 236/12.2, 236/12.11, 12.13, 12.16
See application file for complete search history.

(56) References Cited

U.S. PATENT DOCUMENTS

| | | | | |
|---|---|---|---|---|
| 2,519,381 A | * | 8/1950 | Kreske | 236/12.11 |
| 2,893,637 A | * | 7/1959 | Trubert | 236/12.11 |
| 2,905,387 A | | 9/1959 | Powell | |
| 3,001,717 A | | 9/1961 | Rimsha et al. | |
| 4,113,174 A | * | 9/1978 | Kagiyama et al. | 236/12.11 |
| 4,607,788 A | | 8/1986 | Bendall et al. | |
| 4,760,953 A | | 8/1988 | Trubert | |
| 4,863,097 A | | 9/1989 | Avelov | |
| 5,011,074 A | | 4/1991 | Kline | |
| 5,161,737 A | | 11/1992 | Olmsted et al. | |
| 5,203,496 A | | 4/1993 | Kline | |
| 5,323,960 A | | 6/1994 | Kline | |
| 5,340,018 A | | 8/1994 | MacDonald | |
| 5,341,987 A | | 8/1994 | Ackroyd | |
| 5,379,936 A | | 1/1995 | Kline | |
| 5,647,531 A | | 7/1997 | Kline et al. | |
| 5,738,275 A | * | 4/1998 | Enoki et al. | 236/12.2 |
| 5,779,139 A | | 7/1998 | Ueno | |
| 5,931,374 A | | 8/1999 | Knapp | |
| 5,979,777 A | | 11/1999 | Ems | |
| 5,988,514 A | | 11/1999 | Huang | |
| 6,315,209 B1 | | 11/2001 | Tripp | |
| 6,315,210 B1 | | 11/2001 | Kline | |

(Continued)

FOREIGN PATENT DOCUMENTS

CN 201488037 U * 5/2010

(Continued)

*Primary Examiner* — Ljiljana (Lil) V Ciric
*Assistant Examiner* — Alexis K Cox
(74) *Attorney, Agent, or Firm* — Edwards Angell Palmer & Dodge LLP; David J. Silvia; George N. Chaclas

(57) ABSTRACT

A thermostatic mixing valve (TMV) having a mixing chamber with a plurality of pockets defined therein. The mixing chamber receives cold water flow and hot water flow that has been passed through respective flow inlets and mechanically forced into the pockets defined within the chamber due to axial movement of the plunger. As the hot and cold flow moves into and out of the pockets, the flow streams disperse rather than being maintained in separate flow streams toward the thermostatic element. Because of the increased agitation, the thermostatic element is therefore able to sense a more accurate mixed flow temperature even at low flow rates.

21 Claims, 19 Drawing Sheets

U.S. PATENT DOCUMENTS

| | | |
|---|---|---|
| 6,543,478 B2 | 4/2003 | Kline |
| 6,575,377 B1 | 6/2003 | Graves |
| 6,604,687 B2 * | 8/2003 | Goncze et al. ............... 236/12.2 |
| 6,637,668 B2 | 10/2003 | Eveleigh |
| D494,252 S | 8/2004 | Kline |
| 6,820,816 B1 * | 11/2004 | Reid .......................... 236/12.13 |
| 6,851,440 B2 | 2/2005 | Kline |
| 6,926,205 B2 | 8/2005 | Taylor et al. |
| 6,929,188 B2 | 8/2005 | Taylor et al. |
| 7,240,850 B2 * | 7/2007 | Beck et al. ................... 236/12.2 |
| 7,669,776 B2 * | 3/2010 | Beck et al. ................... 236/12.2 |
| 2001/0020645 A1 * | 9/2001 | Mountford et al. ........ 236/12.11 |

FOREIGN PATENT DOCUMENTS

| | | |
|---|---|---|
| EP | 0 566 433 B1 | 10/1995 |
| EP | 0 936 524 A1 | 8/1999 |

* cited by examiner

THERMOSTATIC MIXING VALVE

CROSS-REFERENCE TO RELATED APPLICATIONS

This application claims priority to and is a continuation-in-part of U.S. patent application Ser. No. 11/357,149 filed on Feb. 17, 2006, which published on Aug. 23, 2007 as U.S. Patent Publication No. 2007/0194137, the contents of which are incorporated herein by reference in its entirety. This application also claims priority to and is a utility application of U.S. Provisional Patent Application Ser. No. 60/887,531 filed on Jan. 31, 2007, the contents of which are also incorporated herein by reference in its entirety.

TECHNICAL FIELD OF THE DISCLOSURE

The present disclosure generally relates to fluid control valves and, more particularly, to thermostatic mixing valves. Even more particularly, the present disclosure relates to a thermostatic mixing valve that is adapted to accommodate a wide range of flows yet does not allow excess flow to bypass a sensing chamber surrounding a thermostat element of the valve.

BACKGROUND OF THE DISCLOSURE

Thermostatic mixing valves (TMVs) are well established and serve to provide a fluid (e.g., water) supply at a desired temperature. TMVs, also referred to as temperature-activated mixing valves, have a temperature responsive thermostat element, or thermal motor, operatively coupled to a valve member controlling fluid flows through hot and cold inlet ports of the valve. The mixed fluids are caused to impinge upon the thermal motor, which in turn expands and contracts and controls the relative proportions of hot and cold fluids passing through the valve. Consequently, when there is an undesirable rise in the temperature of the mixed fluid the thermal motor expands to cause the valve member to reduce the hot flow via the hot inlet port and increase the cold flow via the cold inlet port. Expansion of the thermal motor, therefore, restores the fluid supply temperature condition to that desired, with a converse operation when there is contraction of the thermal motor due to a fall in the mixed fluid temperature.

Large bore TMVs for hot water distribution systems are used to supply hot water for multiple outlets or faucets, such as groups of showers, washbasins, or baths. Large bore TMVs, which are also referred to as master mixing valves, are different than smaller, point-of-use TMVs, in that the large bore TMVs must be capable of passing substantial amounts of properly mixed water when a number of outlets are being used simultaneously. The internal arrangement of the large bore TMV, therefore, is designed such that the high flow rate can be passed without an unduly high-pressure drop. Thus, as its name implies, a large bore TMV is provided with relatively large internal passages to avoid causing any restriction to the mixed water flow under the maximum demand.

There are, however, drawbacks with large bore TMVs, such as achieving sufficient mixing of hot and cold water across a range of flow rates. When there is a low demand for mixed water the velocity of the hot and cold-water streams passing through the large bore TMV drops and is insufficient to mix the two streams fully. The result is that the streams may become laminar and mixing of the hot and cold supplies does not take place. If this happens, then the water surrounding the thermal motor is not fully mixed and as a result the thermal motor may receive a false signal.

One known approach for supplying multiple outlets is to provide a small bore TMV in parallel with a large bore TMV in combination with a pressure reducing valve or some other throttling device on the outlet of the large bore TMV. Thus, when there is a low demand for mixed water the hot and cold streams only pass through the small bore TMV. This approach, however, requires extra hardware in the form of two TMVs and a throttling device and, is therefore, more expensive and requires additional installation steps and maintenance. In addition, temperature regulation is more complicated due to its dependence on the function of two individual TMV thermal motor characteristics.

U.S. Pat. No. 6,604,687 provides another approach and discloses a high flow rate TMV that provides more accurate control of the valve outlet temperature in a low flow rate environment. The valve utilizes a flow-directing element that restricts the flow of water through the valve at low pressures and directs the flow of water toward the thermal motor, such that low flow rates are accommodated. The flow-directing element encircles the thermal motor and is formed from a flexible material so that it expands under pressure of water flowing through the valve, such that high flow rates are accommodated. At no time, however, is excess flow directed so that that it bypasses a "sensing chamber" surrounding the thermal motor.

U.S. Pat. No. 6,820,816, in contrast, provides a TMV for operation across a range of flow rates, wherein excess flow is directed so that that it does bypasses the sensing chamber surrounding the thermal motor. During low flow rate, or normal, operation, check valves in the TMV remain closed so the only pathway mixed water can follow is through the sensing chamber to a discharge portion and out the mixed water outlet. During high flow rate operation the check valves open and allow the mixed water to bypass the sensing chamber and flow directly to the discharge portion and out through the mixed water outlet.

What is still desired is a new and improved thermostatic mixing valve. Preferably the thermostatic mixing valve will be adapted to accommodate a wide range of flows yet will not allow excess flow due to a high-flow rate to bypass a sensing chamber surrounding a thermal motor of the valve.

In addition, what is also desired is an improved thermostatic mixing valve that is adapted to accommodate low and high flow rates while maintaining accurate flow temperature outputs to the thermal motor.

SUMMARY OF THE DISCLOSURE

The present disclosure provides a new and improved thermostatic mixing valve (TMV) adapted to accommodate a wide range of flows. According to one exemplary embodiment, the TMV includes a housing having first and second inlets and an outlet. First and second spaced-apart seats are received in the housing and define a mixing chamber between the first and the second inlets. The second seat separates the mixing chamber from a sensing chamber of the housing and includes a low-flow passageway and a high-flow passageway connecting the mixing chamber and the sensing chamber. The sensing chamber is separate from and connected to the outlet of the housing via outlet ports.

The TMV also includes a plunger movably received between the first and the second seats. The plunger and the first seat define a first valve opening controlling flow from the first inlet to the mixing chamber, and the plunger and the second seat define a second valve opening controlling flow from the second inlet to the mixing chamber. A thermal motor is located within the sensing chamber such that expansion of the thermal motor causes movement of the plunger towards the first seat, such that the first valve opening is closed and the second valve opening is opened.

The TMV also includes a check valve received in the high-flow passageway of the second seat. The check valve is adapted to open and allow additional flow from the mixing chamber to the sensing chamber upon fluid flow through the TMV rising to at least a predetermined high flow rate. The additional flow does not bypass the sensing chamber.

Among other aspects and advantages, the new and improved TMV of the present disclosure accommodates high-flow conditions as well as low-flow conditions. Yet the TMV of the present disclosure does not allow excess flow to bypass the sensing chamber containing the thermal motor. Even at high flow rates, therefore, the TMV accurately mixes fluid.

According to one aspect, the TMV further includes a cylindrical cartridge received within the housing. The first and the second seats, the plunger, and the thermal motor are coaxially mounted within the cartridge, and the mixing chamber and the sensing chamber are contained within and partially defined by the cartridge. The cartridge defines the outlet ports connecting the sensing chamber to the outlets of the housing, and further defines first inlet ports connecting the first inlet of the housing to the first valve opening and second inlet ports connecting the second inlet of the housing to the second valve opening. The cartridge allows easier assembly and disassembly of the TMV. In addition, the cartridge prevents the movable plunger from contacting the housing, and allows the more expensive housing to last longer while the less expensive plunger and valve seats are easily disassembled and replaced when worn.

According to an additional aspect, the housing of the TMV includes an upper portion defining the outlet secured to a lower portion defining the first and the second inlets, and the upper portion can be rotated about an axis of the housing with respect to the lower portion. This rotation feature is very helpful during installation of the TMV and allows the outlet to be oriented between 0° and 360° with respect to the inlets.

According to yet another embodiment of a TMV of the present invention, a TMV for relatively larger valve size, low flow-rate applications is provided having a housing with first and second inlets for receiving hot and cold flow, respectively, and an outlet for outputting a mixed flow. A plunger is further defined within the housing and received within a mixing chamber. The plunger allows fluid communication between the first and second inlets. The mixing chamber has a plurality of pockets for agitating and mixing the hot and cold flow received from the first and second inlets. A mixed flow is then output from the mixing chamber to a thermostat. The thermostat is located within the housing and extends to the plunger. Once a mixed flow temperature is determined, a thermostatic element controls the movement of the plunger in response to the mixed flow temperature.

If a colder temperature is desired, the plunger is lowered between the first and second seats and, thereby, more cold flow is allowed in by the second inlet and less hot flow from the first inlet. The temperature-adjusted fluid is then brought to the mixing chamber. Alternatively, if a warmer temperature is desired, the plunger is lowered between the first and second seats; more hot flow is allowed in by the first inlet and less cold flow from the second inlet and subsequently brought to the mixing chamber. The cycle continues until the thermostatic element reads a desired temperature, at which time the mixed flow is output to the outlet.

The pockets of the mixing chamber are designed to provide a more accurate mixing. These pockets may be substantially identical. In one embodiment, the pockets are formed adjacent to each other about the longitudinal axis of the housing. In yet another embodiment, the plurality of pockets form an annular passage having radial partitions. The pockets are further positioned concentrically about the plunger so that when the plunger moves from a proximal to a distal direction, hot and cold flow is brought into the mixing chamber.

A sensing chamber may also be formed in the low flow-rate TMV of the present invention. The sensing chamber receives the mixed flow stream from the mixing chamber. It is positioned between the mixing chamber and the outlet within the housing. A thermal motor is also at least partially within the sensing chamber and controls movement of the plunger. The thermal motor is responsive to a temperature of the mixed flow stream. As a result of the subject technology, the TMV may have an outlet temperature set as desired such as from 90° to 160° F. If the cold water temperature is under 90°, or the hot water temperature is over 160°, the TMV combines the flows to create an outlet flow that is mixed water of the desired temperature.

Additional aspects and advantages of the present disclosure will become readily apparent to those skilled in this art from the following detailed description, wherein only an exemplary embodiment of the present disclosure is shown and described, simply by way of illustration of the best mode contemplated for carrying out the present disclosure. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

BRIEF DESCRIPTION OF DRAWINGS

Reference is made to the attached drawings, wherein elements having the same reference character designations represent like elements throughout, and wherein:

FIG. 14B is a detailed view to illustrate the position of the plunger in circle B of FIG. 14A.

FIG. 16B is a detailed view to illustrate the position of the plunger in circle B of FIG. 16A.

DETAILED DESCRIPTION OF EXEMPLARY EMBODIMENTS

Figure 1:
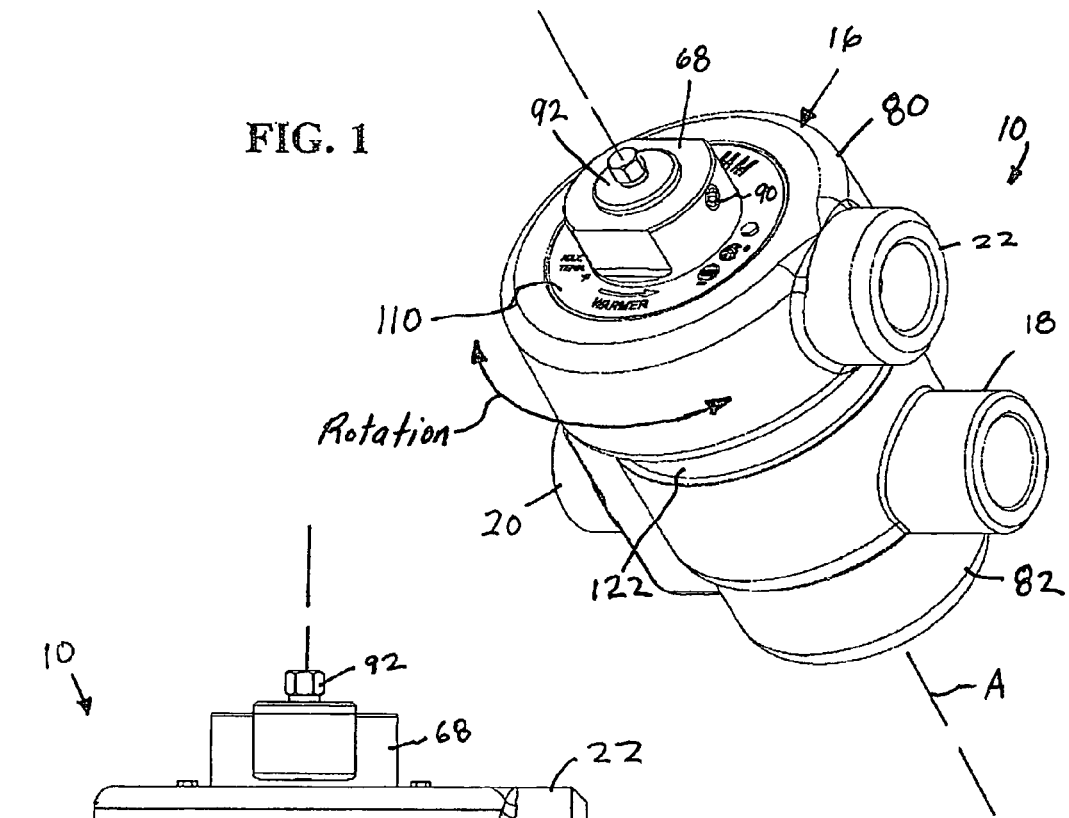
FIG. 1 is a top perspective view of an exemplary embodiment of a thermostatic mixing valve (TMV) constructed in accordance with the present disclosure.
Figure 2:
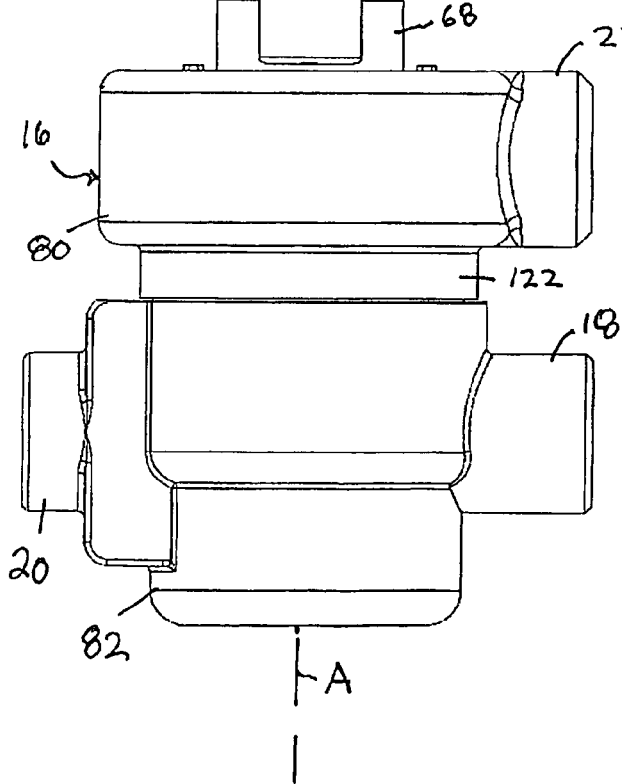
FIG. 2 is a side elevation view of the TMV of FIG. 1.
Figure 3:
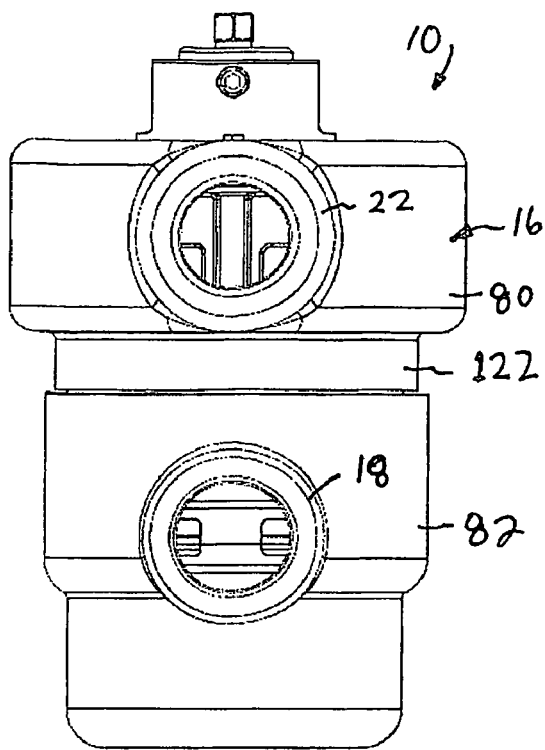
FIG. 3 is a side elevation view of the TMV of FIG. 1 shown rotated 90° from the position shown in FIG. 2.
Figure 4:
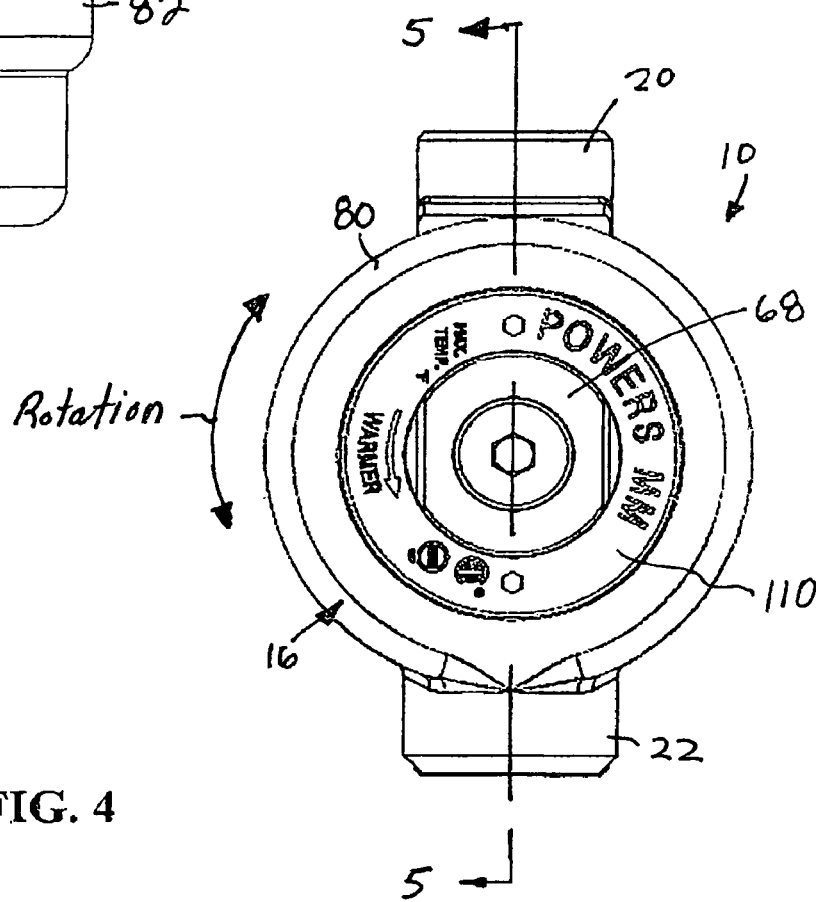
FIG. 4 is a top plan view of the TMV of FIG. 1.

Referring to the figures, an exemplary embodiment of a new and improved thermostatic mixing valve (TMV) 10 according to the present disclosure is shown. Among other benefits, the new and improved TMV 10 of the present disclosure accommodates high-flow conditions as well as low-flow conditions. Yet the TMV 10 of the present disclosure does not allow excess flow to bypass a sensing chamber 12 containing a thermostatic element 14 of the valve. Even at high flow rates, therefore, the TMV 10 accurately mixes hot and cold fluid. All relative descriptions herein such as upper, lower, left, right, up, and down are with reference to the Figures, and not meant in a limiting sense.

The new and improved TMV 10 also includes a cartridge 68 that simplifies assembly of the TMV and the replacement of parts within the TMV. In addition, the new and improved TMV 10 includes a housing 16 having an upper portion 80 secured to a lower portion 82 by the cartridge 68. The upper portion 80 of the housing 16 can be rotated about axis A with respect to the lower portion 82 in order to allow an outlet 22 of the upper portion to be oriented between 0° and 360° with respect to inlets 18, 20 of the lower portion 82 during installation of the TMV 10. The rotation feature is provided to ease connecting conduits to the TMV 10 during installation of the TMV (e.g., an inlet pipe connected to the TMV does not have to be aligned with an outlet pipe connected to the TMV).

Referring to FIGS. 1-6, the first inlet 18 of the TMV 10 is for receiving a first fluid and the second inlet 20 is for receiving a second fluid, and the outlet 22 is for discharging a mixture of the first and the second fluids. In the exemplary embodiment shown, the first inlet 18 is designed to receive hot water, the second inlet 20 is designed to receive cold water, and tempered water is discharged from the outlet 22.

First and second spaced-apart seats 24, 26 are received in the housing 16 and define a mixing chamber 28 between the first and the second inlets 18, 20. The second seat 26 separates the mixing chamber 28 from the sensing chamber 12 of the housing 16 and includes a low-flow passageway 30 and a high-flow passageway 32 connecting the mixing chamber 28 and the sensing chamber 12. The sensing chamber 12 is connected to the outlet 22 of the housing 16 via outlet ports 34.

The TMV 10 also includes a plunger 36 received in the mixing chamber 28 that is movably between the first and the second seats 24, 26. The plunger 36 and the first seat 24 define a first valve opening 38 that controls flow from the first inlet 18 to the mixing chamber 28, and the plunger 36 and the second seat 26 define a second valve opening 40 that controls flow from the second inlet 20 to the mixing chamber 28. A spring 42 biases the plunger 36 away from the first seat 24 to open the first valve opening 38 and close the second valve 40 opening (i.e., more hot water and less cold water).

The thermostat element, or thermal motor 14, is at least partially located within the sensing chamber 12 and extends to the plunger 36. The thermal motor 14 includes a temperature responsive (expandable) piston 44 that extends from a cylinder 46 connected by a flange 48 to a casing 50. In general, the casing 50 contains a thermally expandable wax material, which pushes against the piston 44 to increase the overall length of the thermal motor 14 as a temperature of the wax increases. Expansion of the thermal motor 14, therefore, causes movement of the plunger 36 against the spring 42 and towards the first seat 24, such that the first valve opening 38 is closed and the second valve opening 40 is opened (i.e., less hot water and more cold water). The thermal motor 14 controls the temperature of the mixed fluid.

The TMV 10 also includes a check valve 52 received in the high-flow passageway 32 of the second seat 26. The check valve 52 is adapted to open and allow additional flow from the mixing chamber 28 to the sensing chamber 12 upon fluid flow through the TMV 10 rising to at least a predetermined high flow rate. The check valve 52 opens in response to a predetermined increase in pressure drop between the mixing chamber 28 and the sensing chamber 12. At all times, however, the excess flow passing through the open check valve 52 is directed through the sensing chamber 12 containing the thermal motor 14 of the TMV 10. None of the mixed fluid is allowed to bypass the sensing chamber 12.

The check valve 52 can be of any type sensitive to pressure. The check valve 52 may be spring-loaded and open completely once a certain pressure has been reached, or can be a valve of a type that opens gradually in response to a rise in pressure. If more than one check valve 52 is used, it is also possible to configure the valves to be responsive to different pressure values such that they react in sequence to changes in pressure. Thus as the pressure increases, more valves open, and as the pressure decreases the valves close again. The check valve(s) may be of any configuration or number to allow the desired fluid pressure dependent bypass of fluid necessary to allow the proper functioning of the TMV 10.

Figure 10:
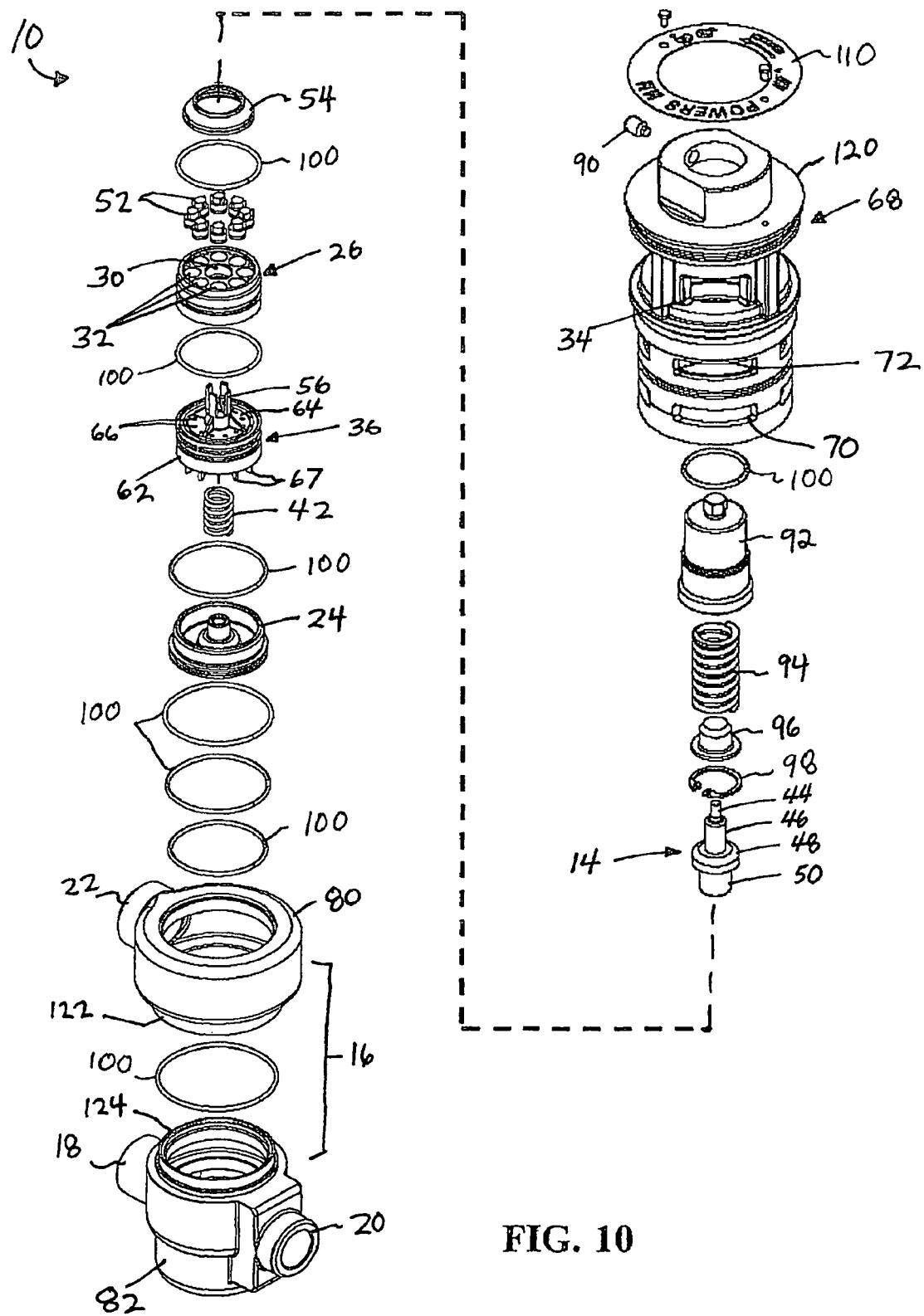
FIG. 10 is an exploded top perspective exploded view of the TMV of FIG. 1.

In the exemplary embodiment shown, the low-flow passageway 30 is centrally located in the second seat 26, and the second seat 26 includes a plurality of the high-flow passageways 32 arrayed around the low-flow passageway 30. Each high-flow passageway 32 contains one of the check valves 52. The arrayed high-flow passageways 32 of the second seat 26 are shown best in FIG. 10 of the drawings. Each of the check valves comprises a spring-loaded check valve 52 that opens completely once the predetermined high rate of flow has been reached, and then closes completely once the flow drops.

Figure 7A:
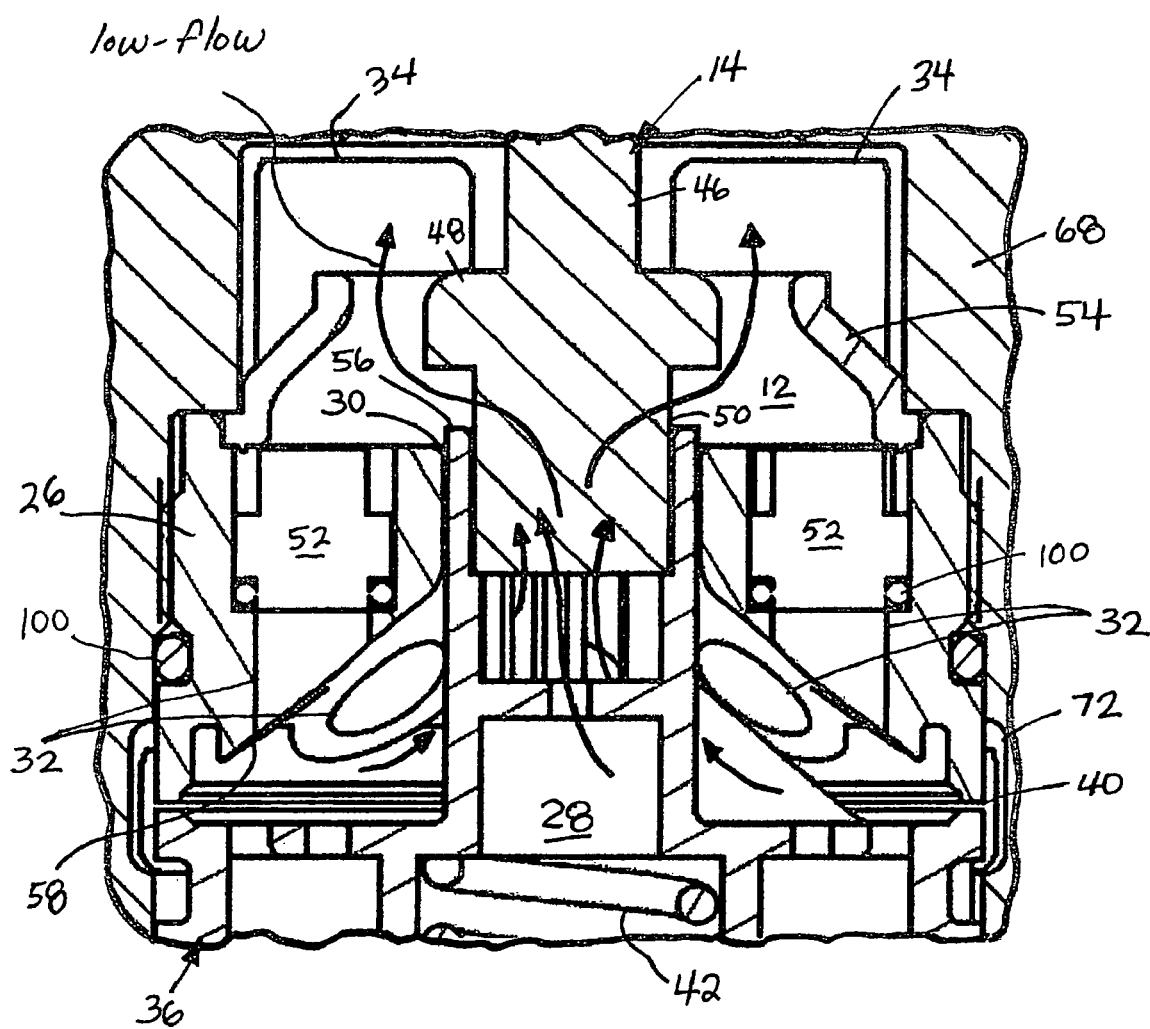
FIG. 7A is a further enlarged sectional view of the TMV of FIG. 1 contained within circle 7 of FIG. 5, wherein low-flow conditions are illustrated.
Figure 7B:
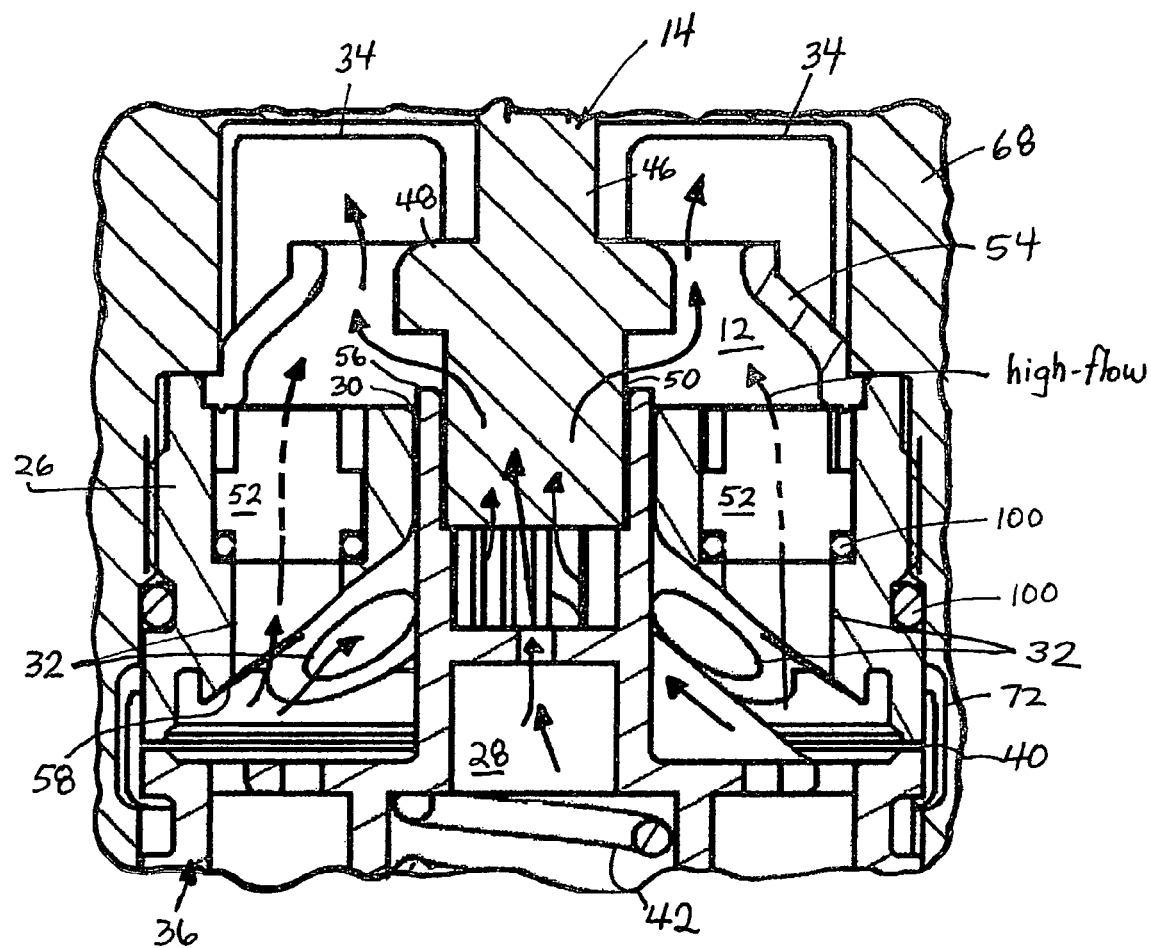
FIG. 7B is a further enlarged sectional view of the TMV of FIG. 1 contained within circle 7 of FIG. 5, wherein high-flow conditions are illustrated.
Figure 8:
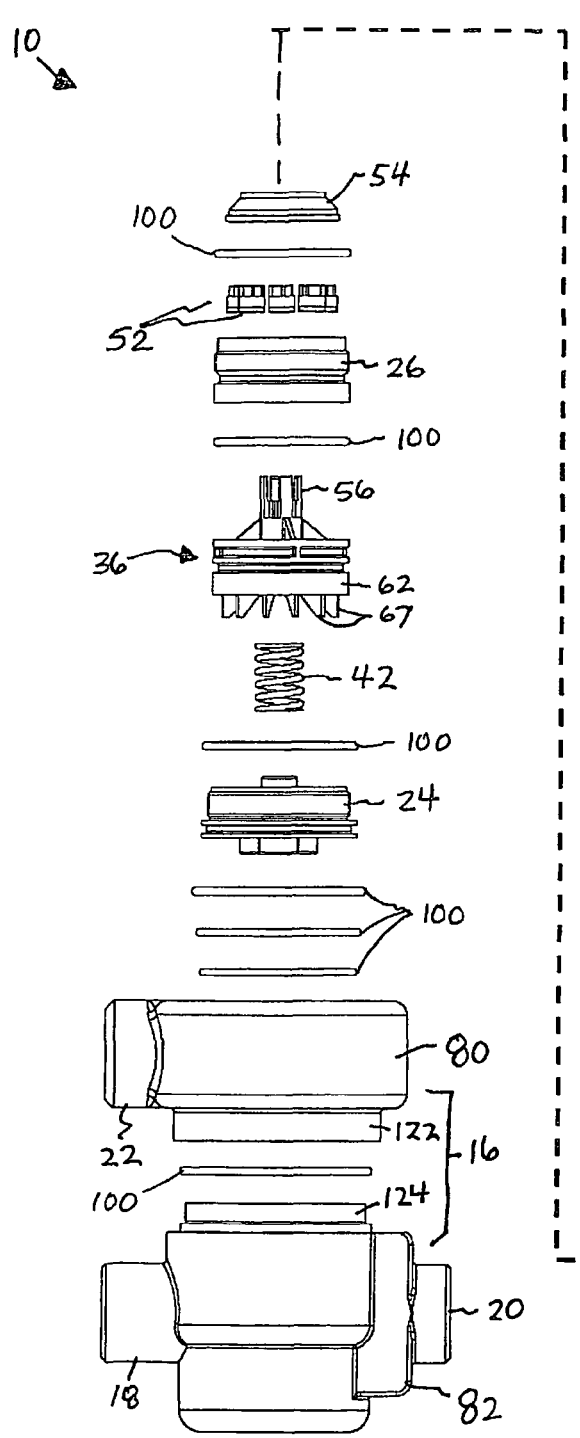
FIG. 8 is an exploded side elevation view of the TMV of FIG. 1 shown rotated 180° from the position shown in FIG. 2.
Figure 8:
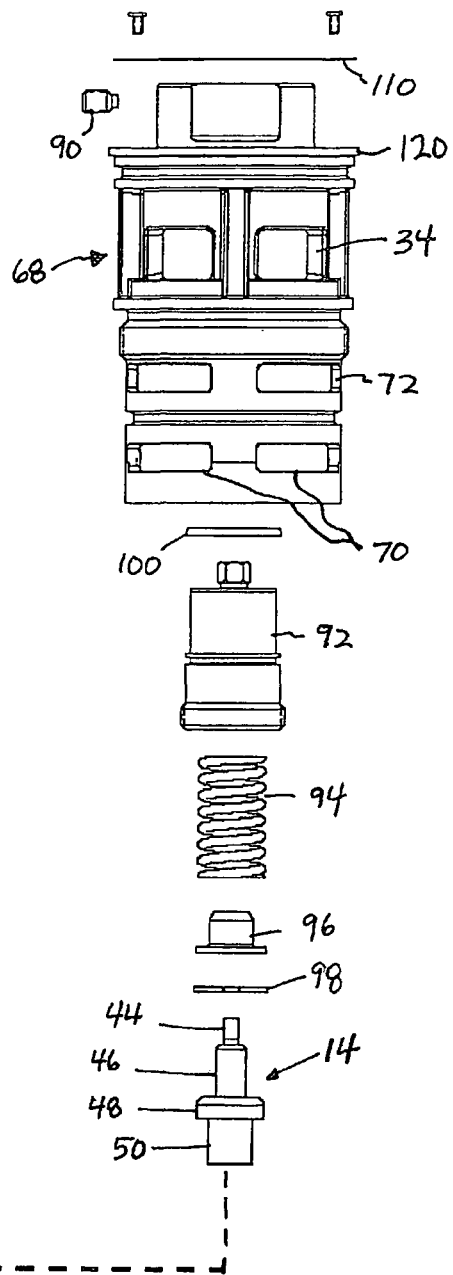

FIG. 7A illustrates low-flow conditions within the TMV 10, while FIG. 7B illustrates high-flow conditions. As shown, during low-flow conditions fluid is only allowed to pass through the low-flow passageway 30 of the second seat 26, while during high-flow conditions fluid is also allowed to flow through the high-flow passageways 32. As shown in FIGS. 7A and 7B, the TMV 10 also includes a flow-directing element 54 extending from the second seat 26 that directs fluid flow from the high-flow passageways 32 towards the thermal motor 14. In one exemplary embodiment the flow-directing element 54 is rigid. Alternatively, the flow-directing element 54 can be flexible.

In the exemplary embodiment shown, the plunger 36 includes a socket 56 extending through the low-flow passageway 30 of the second seat 26. The socket 56 has openings for allowing flow through the low-flow passageway 30, and the thermal motor 14 is received in the socket 56. The casing 50 of the thermal motor 14 is partially received in the socket 56 of the plunger 36, and at least a portion of the casing 50 of the thermal motor 14 is received in the sensing chamber 12. The socket 56 is shown in FIGS. 5-10 of the drawings.

In the exemplary embodiment shown, the second seat 26 includes a funnel 58 on an underside thereof for directing fluid from the mixing chamber 28 to the low-flow passageway 30. The plunger 36 includes coaxial inner and outer tubes 60, 62 connected by a lateral wall 64. Fins 67 are provided between the inner and outer tubes 60, 62, and the lateral wall 64 includes apertures 66 for allowing the mixture of fluid flow from the first and the second valve openings 38, 40. A bottom edge of the outer tube 62 forms the first valve opening 38 in combination with the first seat 24, and a top edge of the outer tube 62 forms the second valve opening 40 in combination with the second seat 26.

According to another aspect of the present disclosure, the TMV 10 further includes the cartridge 68 received within the housing 16. The cartridge 68 is shown in FIGS. 5, 6, and 8-10 of the drawings. The first and the second seats 24, 26, the plunger 36, and the thermal motor 14 are coaxially mounted within the cartridge 68, which is generally cylindrical, and the mixing chamber 28 and the sensing chamber 12 are contained within and partially defined by the cartridge 68.

The cartridge 68 defines the outlet ports 34 connecting the sensing chamber 12 to the outlets 22 of the housing 16, and further defines first inlet ports 70 connecting the first valve opening 38 to the first inlet 18 of the housing 16 and second inlet ports 72 connecting the second valve opening 40 to the second inlet 20 of the housing 16. Screw threads secure the cartridge 68 within the housing 16, and secure the first and the second seats 24, 26 within the cartridge 68. The cartridge 68 allows easier assembly and disassembly of the TMV 10. In addition, the cartridge 68 prevents the movable plunger 36 from contacting the housing 16, and allows the more expensive housing 16 to last longer while the less expensive plunger 36 and valve seats 24, 26 are easily disassembled and replaced when worn.

It should be understood, however, that a TMV including a cartridge and a TMV including high-flow passageways and check valves are separate and independent inventions, which may be combined in a single TMV as shown in the exemplary embodiment of the drawings. Alternatively, a TMV constructed in accordance with the present disclosure can include the high-flow passageways and the check valves, but not include the cartridge.

Figure 5:
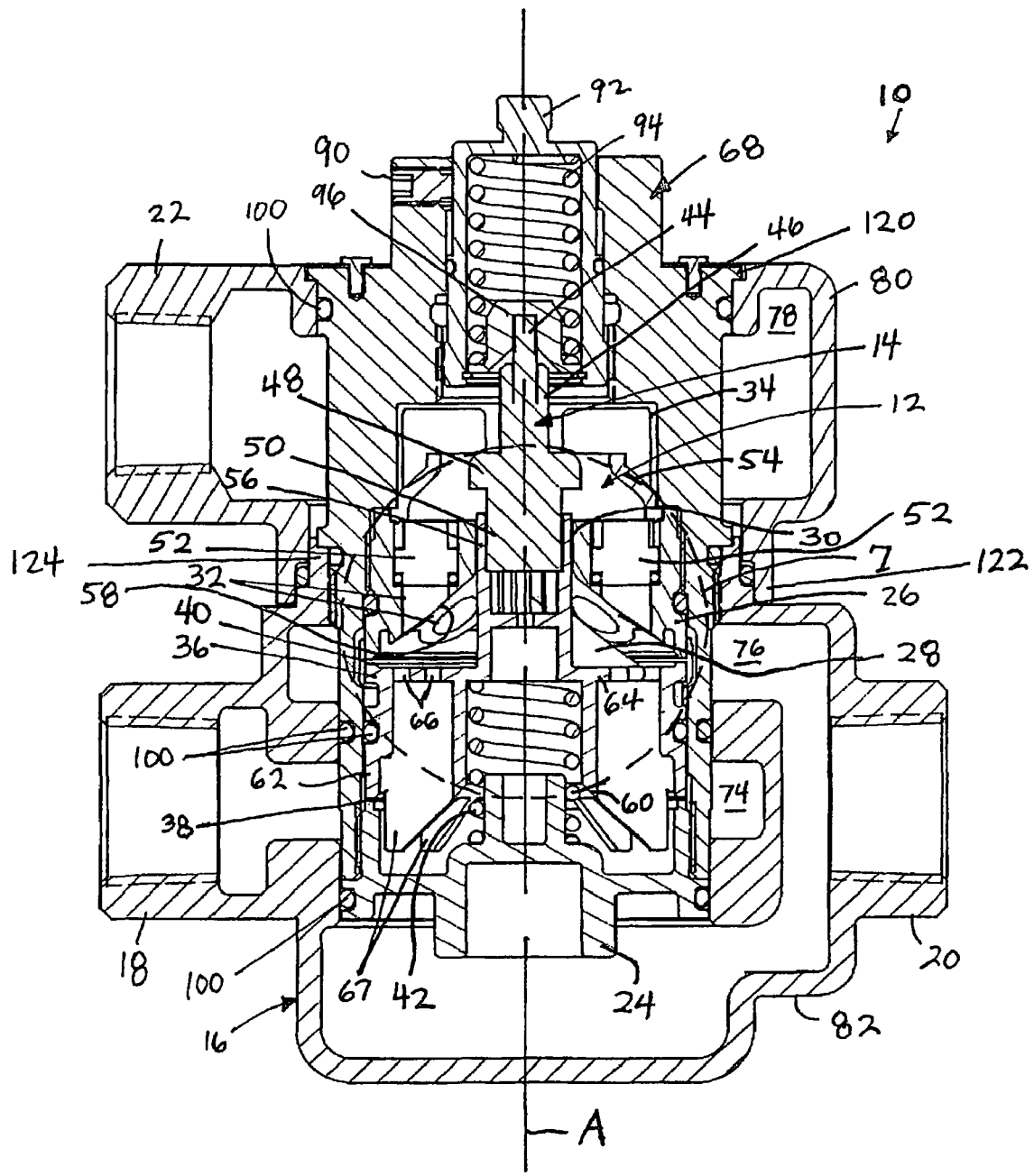
FIG. 5 is an enlarged sectional view of the TMV of FIG. 1 taken along line 5-5 of FIG. 4.
Figure 6:
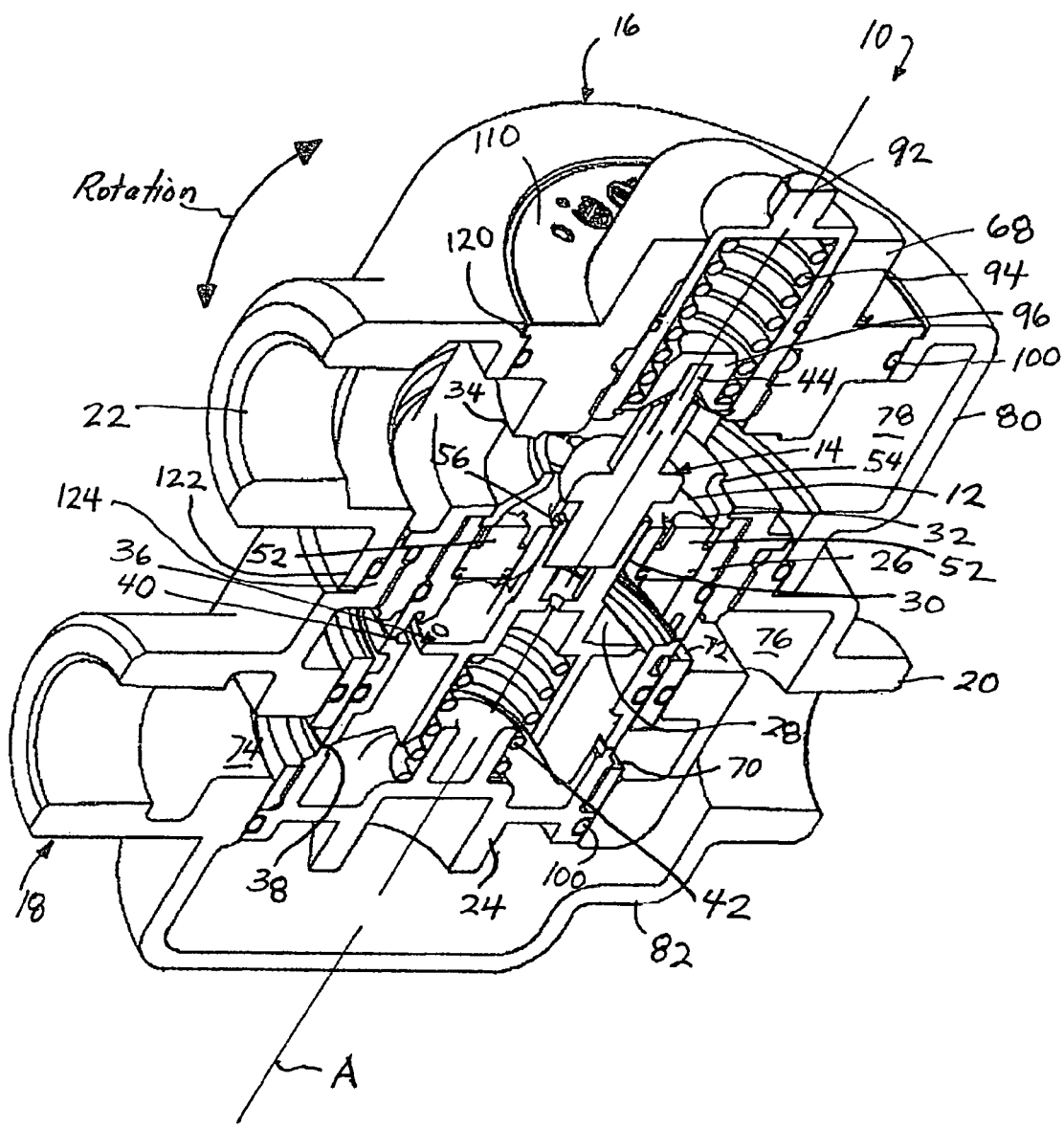
FIG. 6 is an enlarged sectional view, in perspective, of the TMV of FIG. 1 taken along line 5-5 of FIG. 4.
Figure 9:
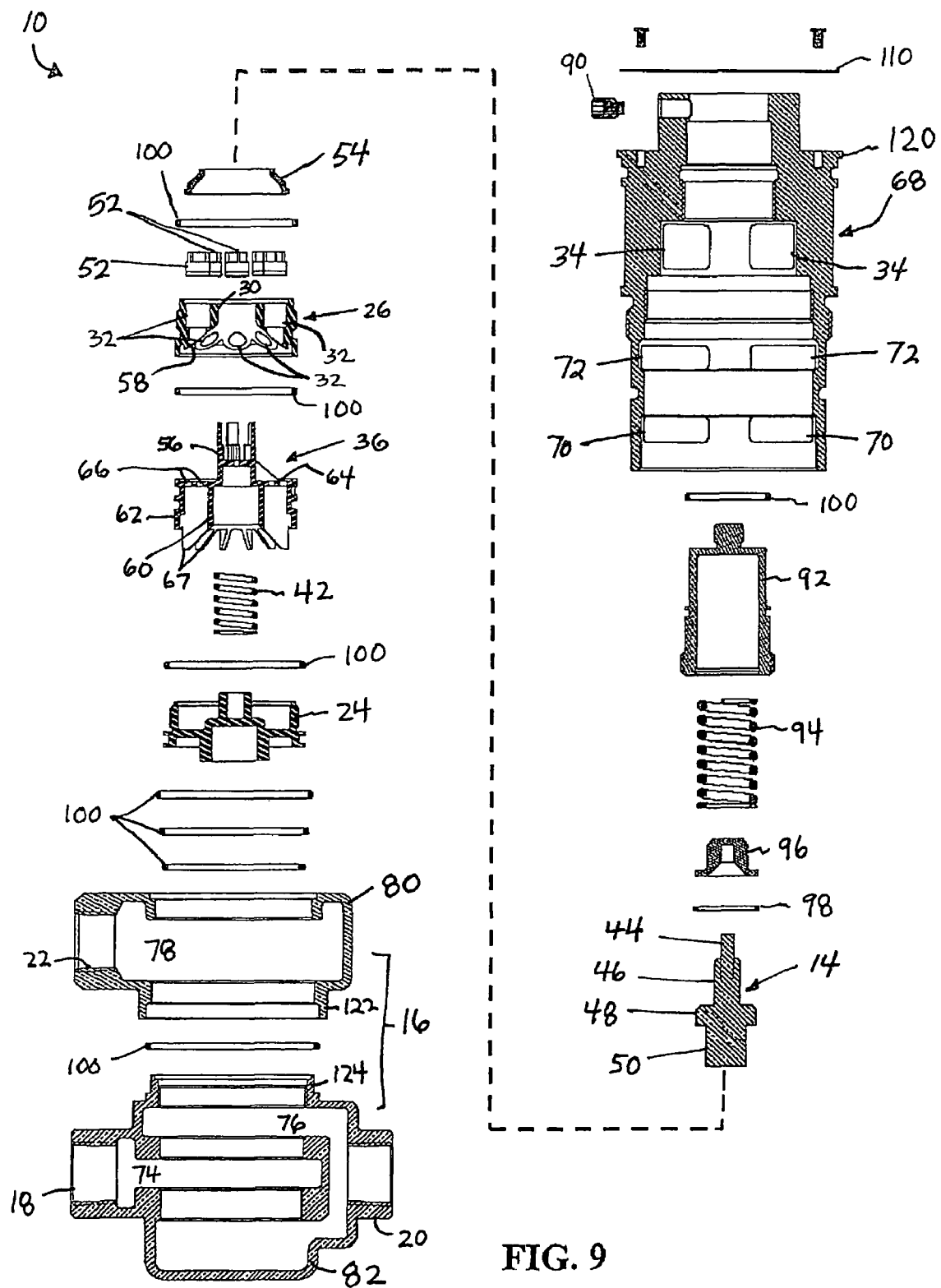
FIG. 9 is an exploded sectional view of the TMV of FIG. 1 taken along line 5-5 of FIG. 4.

In the exemplary embodiment shown, the housing 16 further comprises an annular first inlet chamber 74 connected to the first inlet 18 and surrounding the first inlet ports 70 of the cartridge 68, an annular second inlet chamber 76 connected to the second inlet 20 and surrounding the second inlet ports 72 of the cartridge 68, and an annular outlet chamber 78 connected to the outlet 22 and surrounding the outlet ports 34 of the cartridge 68. These chambers are shown in FIGS. 5, 6, and 9 of the drawings.

According to one aspect of the present disclosure, the housing 16 includes the upper portion 80 secured to the lower portion 82 by the cartridge 68. As illustrated by rotation arrows in FIGS. 1, 4, and 6, the TMV 10 is adapted such that the upper portion 80 of the housing 16 can be rotated with respect to the lower portion 82. This rotation feature is very helpful during installation of the TMV 10 and allows the outlet 18 to be oriented between 0 and 360° with respect to the first inlet 18 or the second inlet 20. In the exemplary embodiment shown, the first inlet 18, the second inlet 20, and the outlet 18 all extend radially outwardly from a central axis A of the TMV 10.

In the exemplary embodiment shown, the cartridge 68 is secured to the lower portion 82 by the screw threads, and in-turn includes a lip 120 that holds the upper portion 80 against the lower portion 82. The upper portion 80 includes a female extension 122 that is received over a male extension 124 of the lower portion 82. The lip 120 of the cartridge 68, the female extension 122 of the upper portion 80, and the male extension 124 of the lower portion 82 are provided with smooth surfaces such that the upper portion 80 can be rotated on the lower portion 82 and the cartridge 68. In an alternative embodiment, the upper portion 80 can be provided with a male extension and the lower portion 82 can be provided with a female extension.

The TMV 10 also includes an adjustable motor positioning assembly including a setscrew 90, a case 92, a spring 94, a cap 96, and a retainer ring 98. The TMV 10 further includes numerous o-rings 100 providing fluid-tight seals between the assembled parts of the TMV. In the exemplary embodiment shown, a label 110 is secured to an exposed top of the cartridge 68 with screws or by other means.

Figure 11:
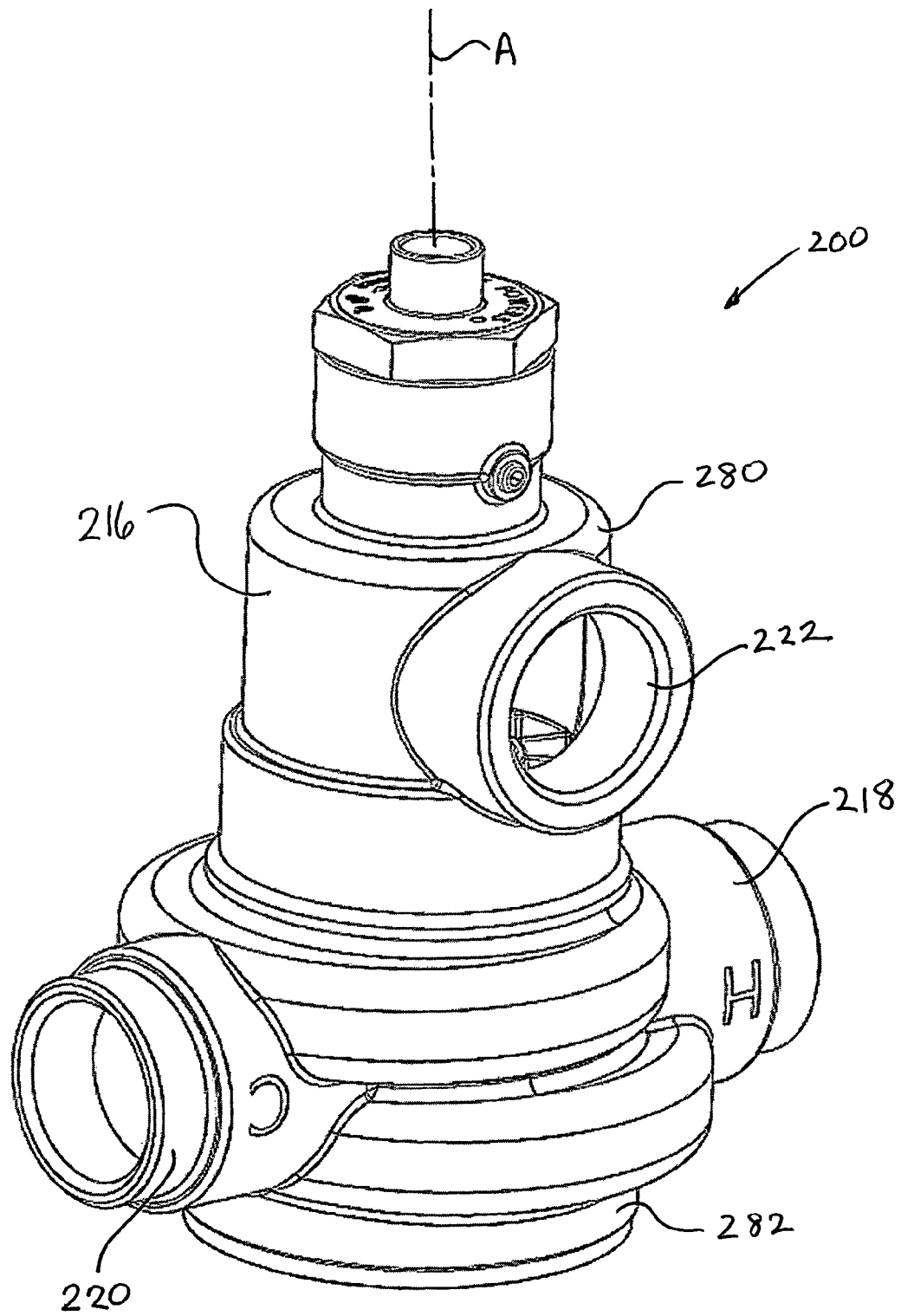
FIG. 11 is a top perspective view of another exemplary embodiment of a TMV constructed in accordance with the present disclosure.

Referring to now FIG. 11, an exemplary embodiment of another TMV is shown in perspective view and referred to generally by the reference numeral 200. The TMV 200 is particularly advantageous for relatively larger valve size, low flow rate applications because the TMV 200 provides increased mixing of hot and cold flows. The increased mixing improves the performance of the TMV 200. As will be appreciated by those of ordinary skill in the pertinent art, the TMV 200 utilizes similar principles to the TMV 10 described above. Accordingly, like reference numerals preceded by the numeral "2" are used to indicate like elements when possible. The primary differences of the TMV 200 in comparison to the TMV 10 are the structure of the plunger and funnel to create a plurality of agitating pockets, and the omission of check valves. The following description is directed largely to these differences.

The TMV 200 includes a housing 216, which has an elongated structure. The housing 216 has a longitudinal axis A with a "proximal" portion 282 and a "distal" portion 280. The housing 216 defines a cold inlet 220 and an opposing hot inlet 218, both being located towards the proximal portion 282 of the housing 216. The inlets 218, 220 receive a hot and cold fluid, respectively, in a direction substantially perpendicular to the axis A. An outlet 222 is also formed near the distal portion 280 of the housing 216.

Figure 12:
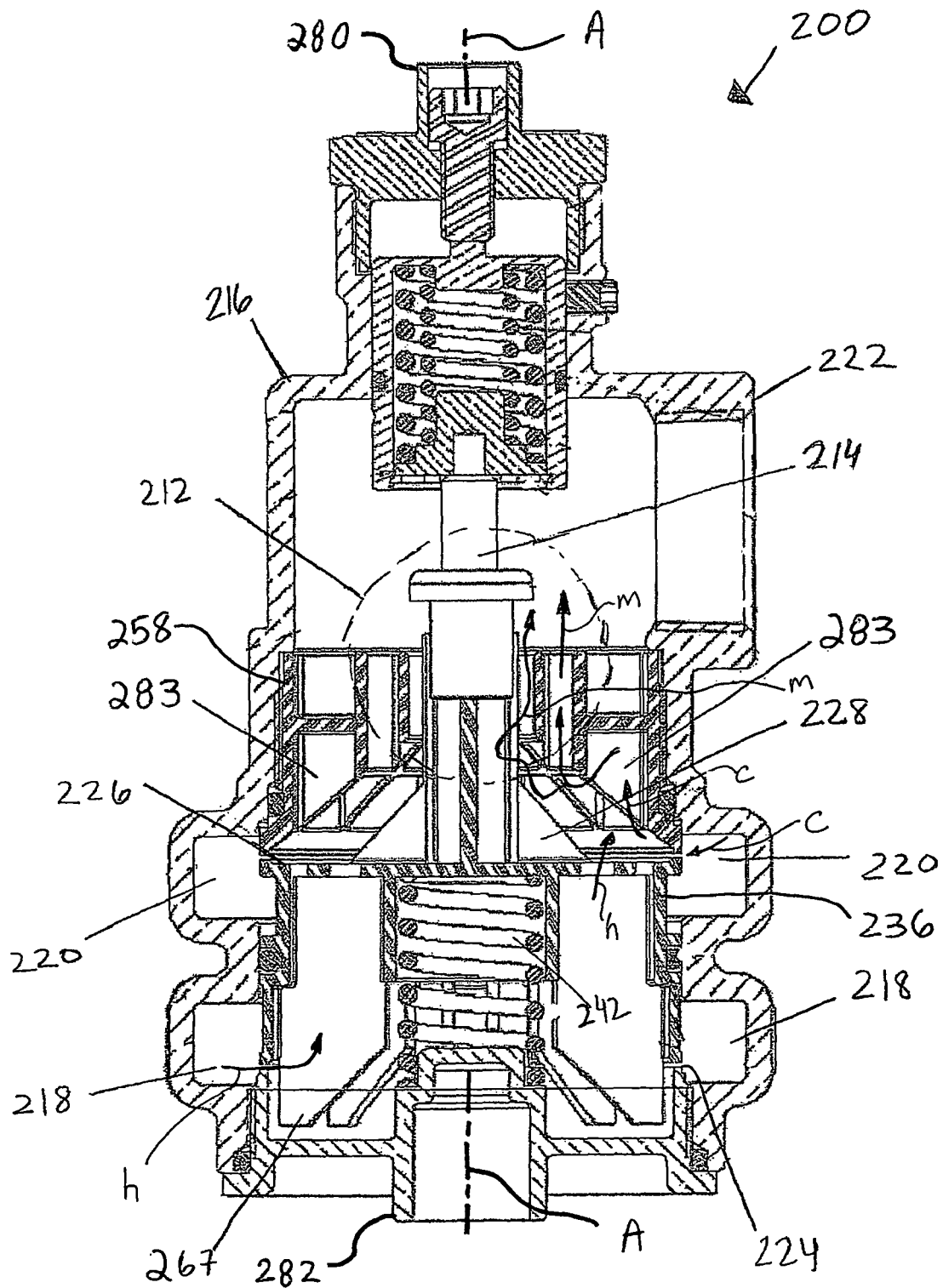
FIG. 12 is an enlarged sectional view of the TMV of FIG. 11 to illustrate the mixing chamber with a plurality of agitating pockets.
Figure 13:
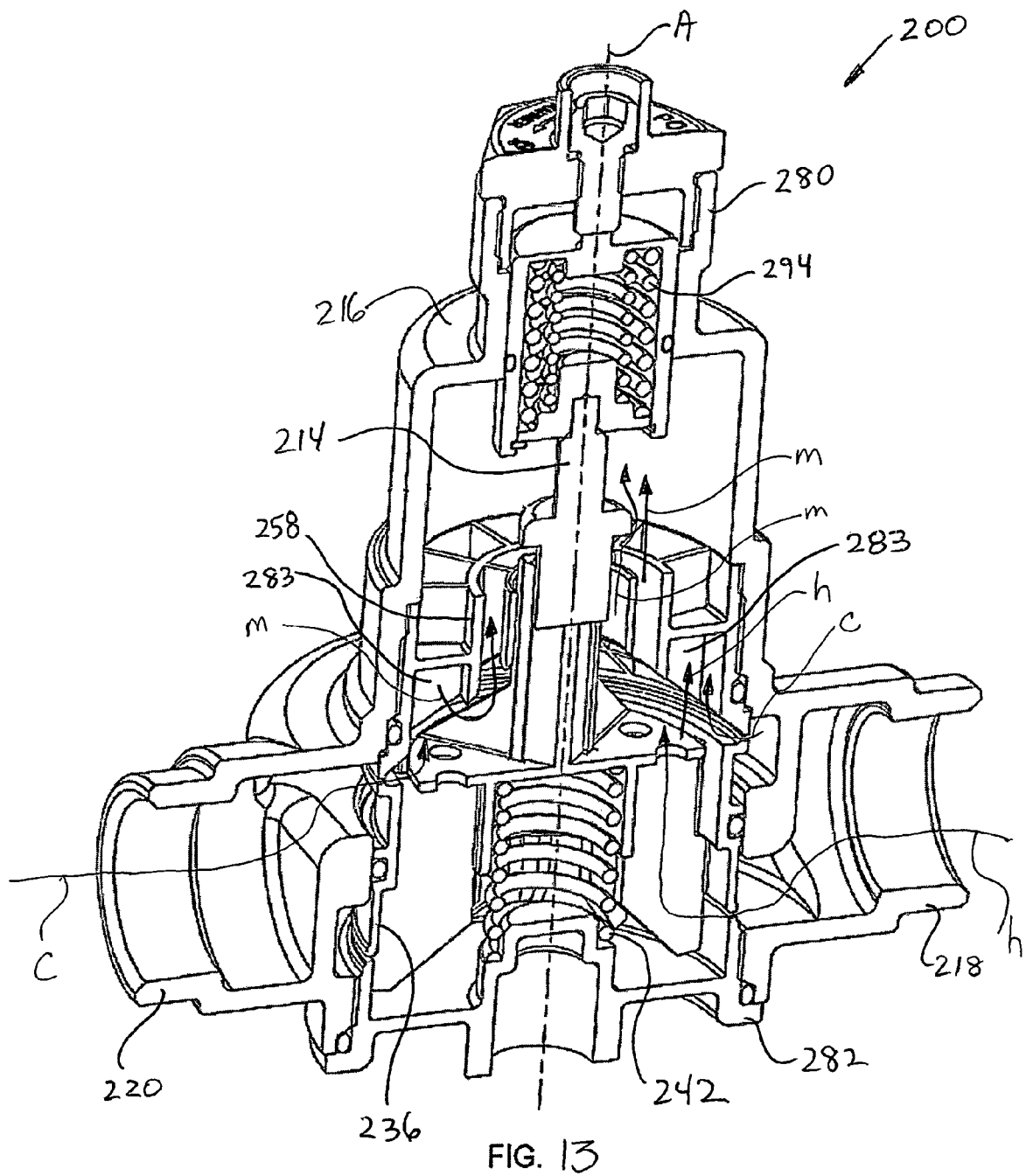
FIG. 13 is a perspective sectional view of the TMV of FIG. 1 shown rotated 90° from the position shown in FIG. 11.

Referring to FIGS. 12 and 13, sectional view of the TMV are shown. The TMV 200 includes a mixing chamber 228 within the housing 216. The mixing chamber 228 is in fluid communication with the cold inlet 220, the hot inlet 218 and the outlet 222. The mixing chamber 228 includes a plurality of agitating pockets 283 formed in the funnel 258. The pockets 283 create turbulence to agitate and mix the cold and hot flows within the mixing chamber received from the respective inlets 218, 220 as described further below.

The plunger 236 interacts with the first or hot seat 224 and the second or cold 226 seat also provided within the housing 216. Driven by the thermostatic element 214, the plunger 236 moves along the longitudinal axis A between the first seat 224 and the second seat 226. The relationship between the plunger 236 and the seats 224, 226 determines the influx of hot and cold flow. Specifically, the plunger 236 and the first seat 224 control an amount of hot flow from the first inlet 218 to the mixing chamber 228, while the plunger 236 and the second seat 226 control an amount of cold flow from the second inlet 220 to the mixing chamber 228.

Figure 14A:
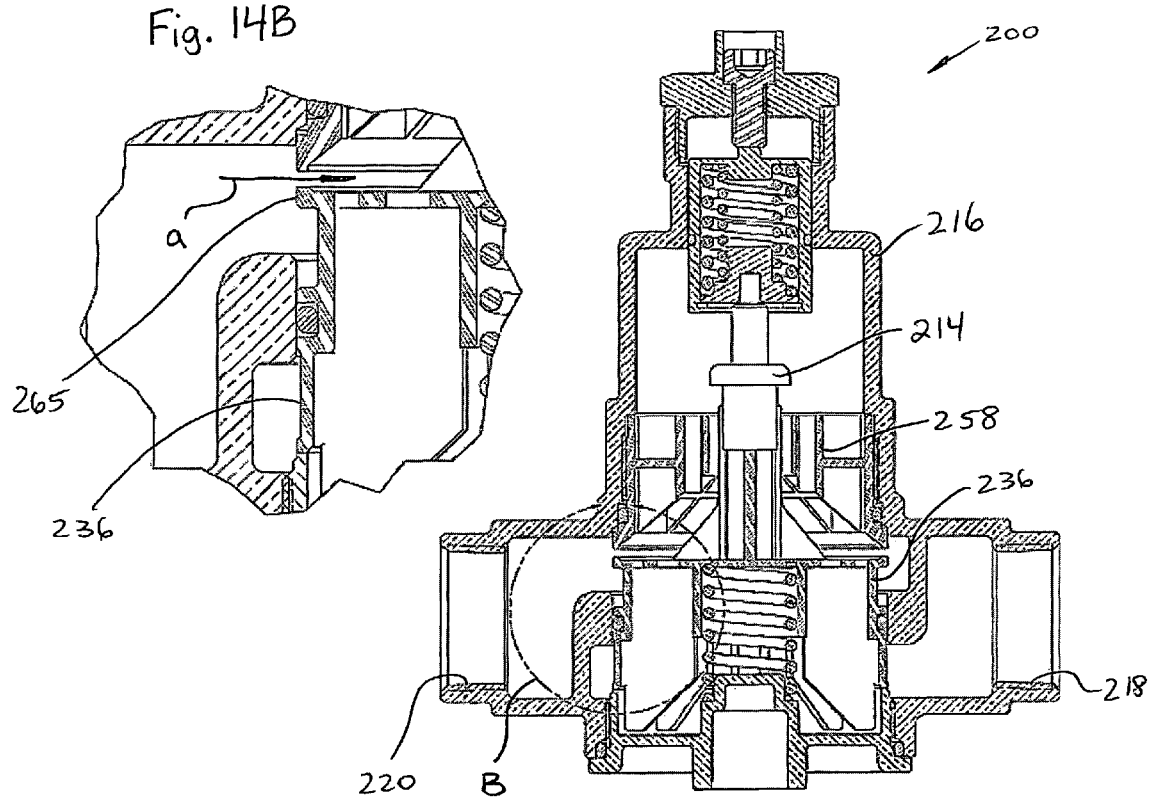
FIG. 14A is a sectional view of the TMV of FIG. 11 to illustrate the plunger positioned to allow only cold water to flow into the mixing chamber.
Figures 15A, 15B:
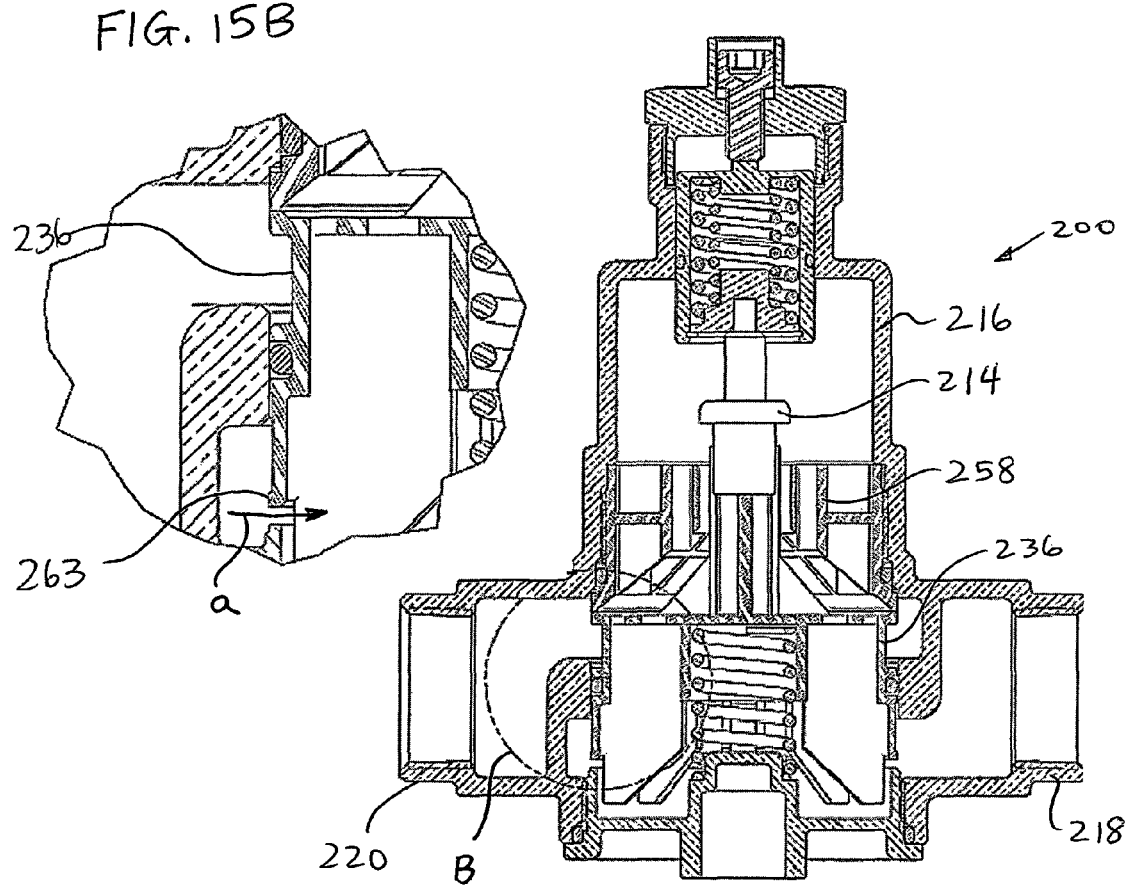
FIG. 15A is a sectional view of the TMV of FIG. 11 to illustrate the plunger positioned to allow only hot water to flow into the mixing chamber.
FIG. 15B is a detailed view to illustrate the position of the plunger in circle B of FIG. 15A.

Referring now to FIGS. 14A-16B, the TMV 200 is shown with the plunger positioned in various positions. The flow paths across the seats 224, 226 are noted by flow arrows "a". FIGS. 14A and 14B, show the TMV 200 positioned to allow only cold water to flow into the mixing chamber 228 as would be desirable under certain conditions. FIGS. 15A and 15B, show the TMV 200 positioned to allow only hot water to flow into the mixing chamber 228 as would be desirable under certain conditions.

Figure 16A:
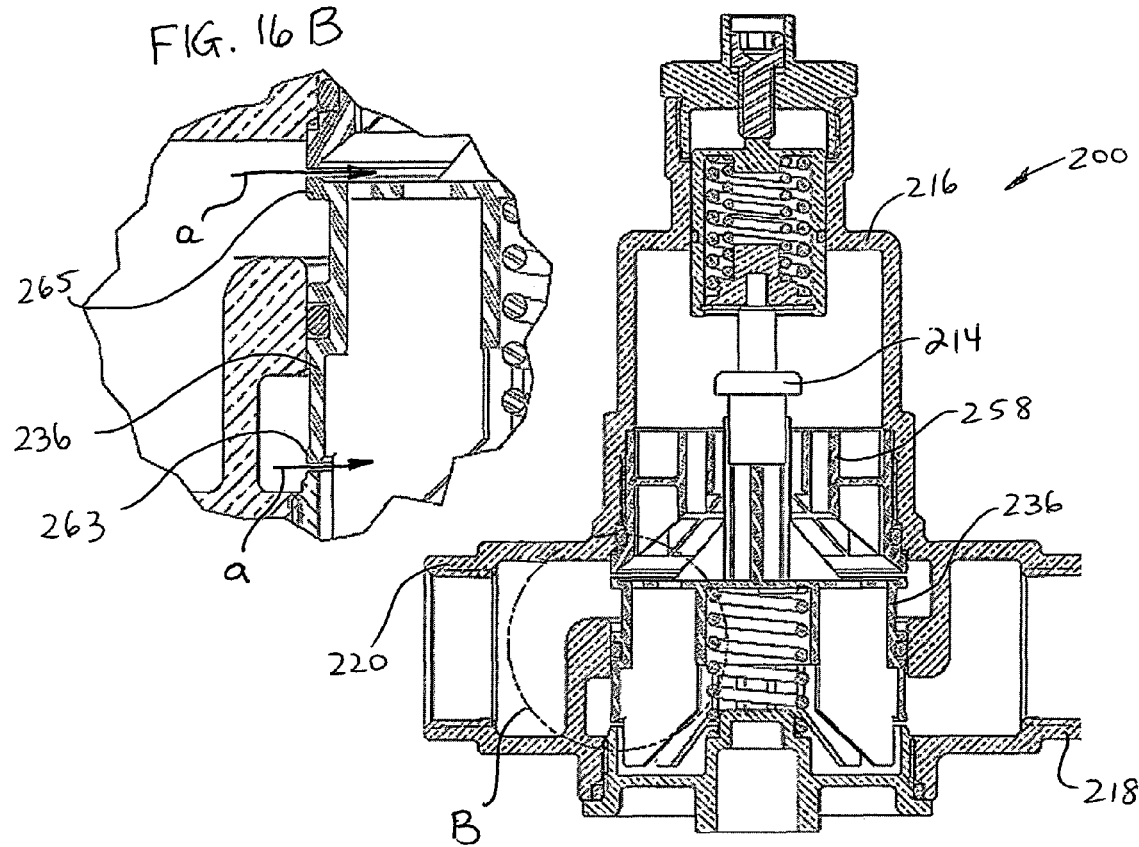
FIG. 16A is a sectional view of the TMV of FIG. 11 to illustrate the plunger positioned to allow hot and cold water to flow into the mixing chamber.

Referring specifically to FIGS. 16A and 16B, the TMV 200 is shown positioned to allow both hot and cold water to flow into the mixing chamber 228 for mixing, e.g., the mixing position, as would be desirable under certain conditions. Referring again to FIGS. 12 and 13, in the mixing position, the hot water path is generally shown with flow arrows "h" and the cold water path is generally shown with flow arrows "c". After mixing, the mixed water path is shown generally with flow arrows "m".

A spring 242 normally biases the plunger 236 away from the first seat 224, for example, to allow fluid to flow in from the hot inlet 218 and close off cold flow from the cold inlet 220 (i.e., more hot water and less cold water). If a colder flow temperature is needed, a thermostatic element 214 attached to the plunger 236 overcomes the spring bias to move the plunger 236 away from the second seat 226 (i.e., more cold water and less hot water). The thermostatic element 214 is at least partially located in the sensing chamber 212.

Figure 17:
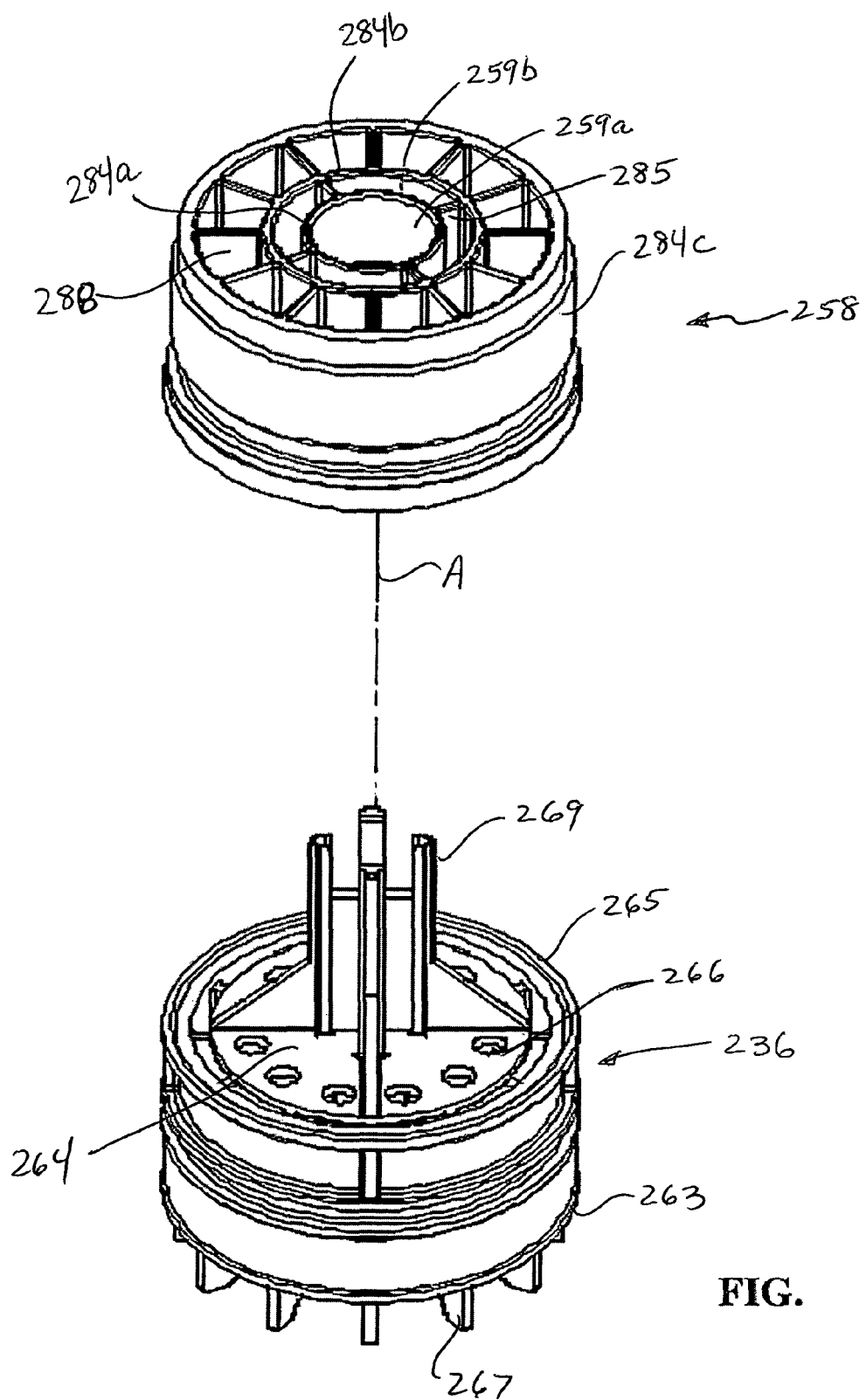
FIG. 17 is a perspective view of a mixing chamber portion, namely a plunger and funnel for the housing of the TMV according to FIG. 11.
Figure 18:
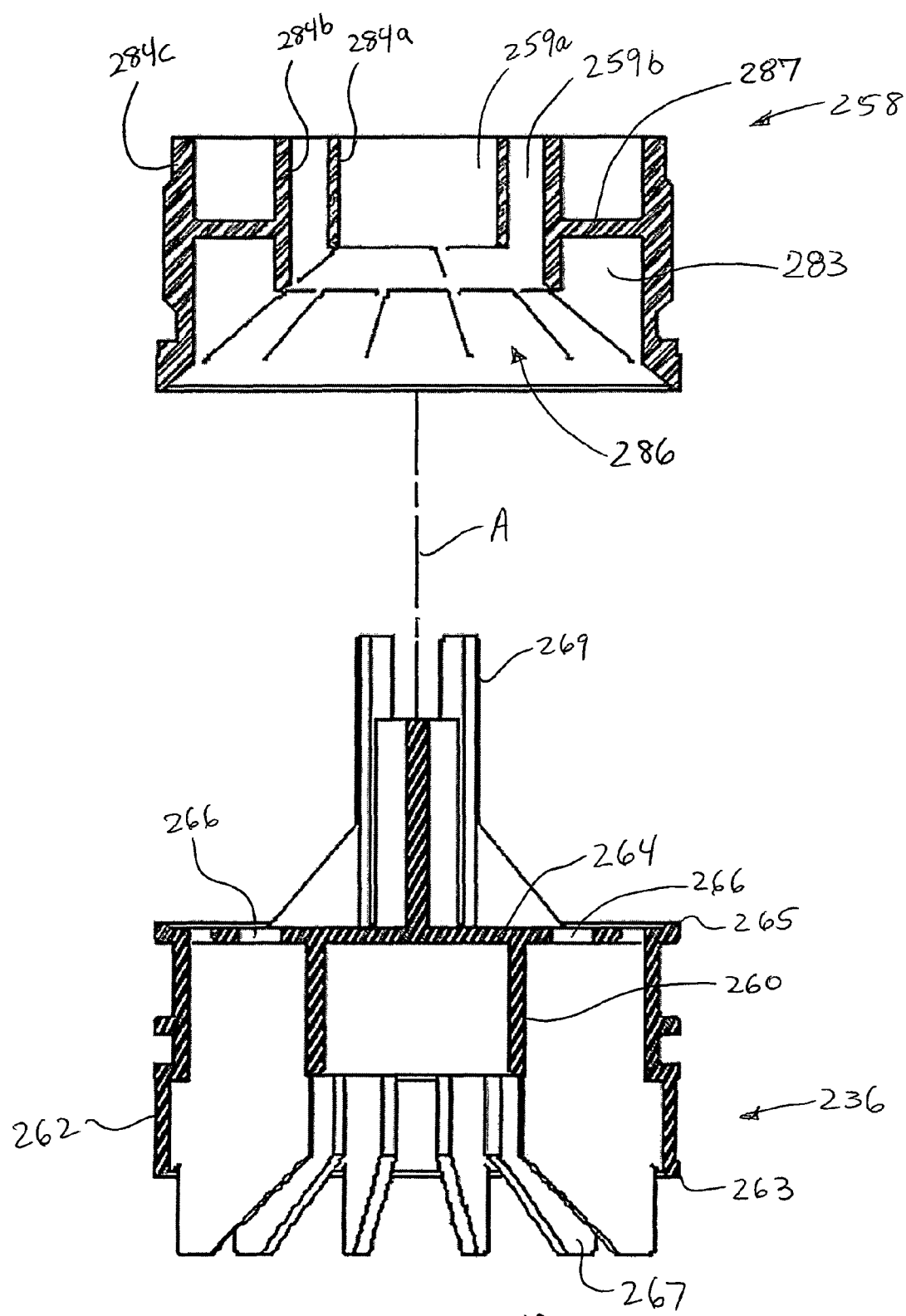
FIG. 18 is a sectional view of the mixing chamber portion of FIG. 17.

Referring to FIGS. 17 and 18, the plunger 236 includes coaxial inner and outer tubes 260, 262 connected by a lateral wall 264. Radial fins 267 are provided between the inner and outer tubes 260, 262. A bottom edge 263 of the outer tube 262 forms the hot valve opening in combination with the first seat 224, and a top edge 265 of the outer tube 262 forms the cold valve opening in combination with the second seat 226. The lateral wall 264 of the plunger 236 has a plurality of passages 266 to allow the hot flow to enter the mixing chamber 228 as shown by arrows "h".

After passing by the plunger 236 and seats 224, 226, the water enters the mixing chamber 228. The mixing chamber 228 is partially defined by the funnel 258. The funnel 258 serves to mix the cold and hot flows and direct the resulting mixed flow into the sensing chamber 212, shown by the dotted line in FIG. 12, via inner and outer annular passages 259a, 259b. A distal portion 269 of the plunger 236 is received within the inner annular passage 259a.

The passages 259a, 259b are defined by two coaxial central tubes 284a, 284b. The central tubes 284a, 284b are connected to each other by radial partitions 285 and, in turn, the intermediate central tube 284b is connected to an outer tube 284c of the funnel 258 by additional radial partitions 288. As best seen in FIG. 18, the axial length of funnel tubes 284a-c becomes progressively shorter in the axially inward direction so that the proximal portion of the funnel 258 defines a narrowing trapezoidal or funnel-shaped space 286. The distal portion 269 of the plunger 236 has a complimentary configuration that nestles within the trapezoidal space 286. As fluid flows generally into the pockets 283 and radially inwardly in the funnel 258, the trapezoidal space 286 facilitates efficient flow and mixing.

The outer tube 284c and the intermediate tube 284b of the funnel 258 are also at least partially connected by a lateral wall 287. The outer tube 284c, the intermediate tube 284b and the lateral wall 287 of the funnel 258 define a plurality of pockets 283 specifically designed to address the issue of mixing of hot and cold flows. In the illustrated embodiment, each of the pockets 283 are substantially identical, however, the size and shape of the pockets may differ. As shown in FIGS. 17 and 18, each of the plurality of pockets 283 are adjacent to each other and form a overall ring or annular shape with the radial partitions 288 roughly intermediate the apertures 266 of the plunger 236 so that each pocket 283 axially aligns with an aperture 266. The relative location, spacing, number and shape of the radial partitions may vary. Indeed, the partitions may be minimized so that the pockets 283 are actually a single annular mixing trough. Alternatively, the configuration of the lateral wall 287 and the tubes 284a-c could vary different shapes and include additional protrusions, annular flanges and the like to enhance mixing and flow.

The sectional views of FIGS. 12 and 13 depict the orientation of the pockets 283 about the longitudinal axis A of the housing 216 in this embodiment. As the plunger 236 moves distally to the mixing position seen in FIGS. 16a and 16b, the pockets 283 become positioned concentrically about the plunger 236. As hot and cold flows are received within the pockets 283 of the mixing chamber 228, the pockets 283 receive and mix the hot and cold flows, combining the flow streams to pass outward. Then, the flow is split into the annular passages 259a, 259b. As the mixed flow exits the annular passages 259a, 259b, the mixed flow is output to the sensing chamber 212. By virtue of the flow being well mixed, the thermostatic element 214 in the sensing chamber 212 operates more accurately. Eventually the mixed flow passes to the outlet 222 for consumption.

Figure 19:
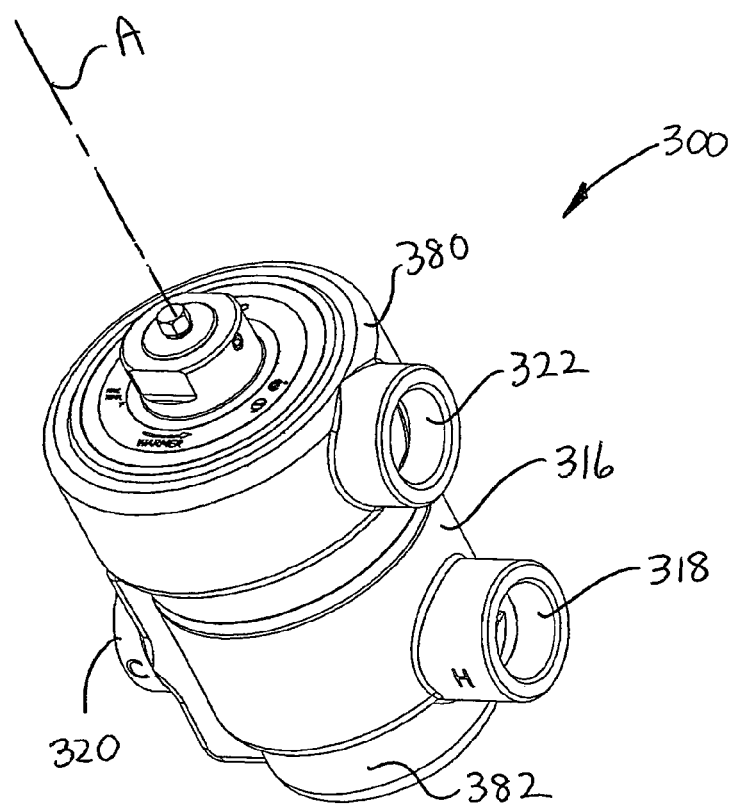
FIG. 19 is a top or distal perspective view of another exemplary embodiment of a TMV constructed in accordance with the present disclosure.
Figure 20:
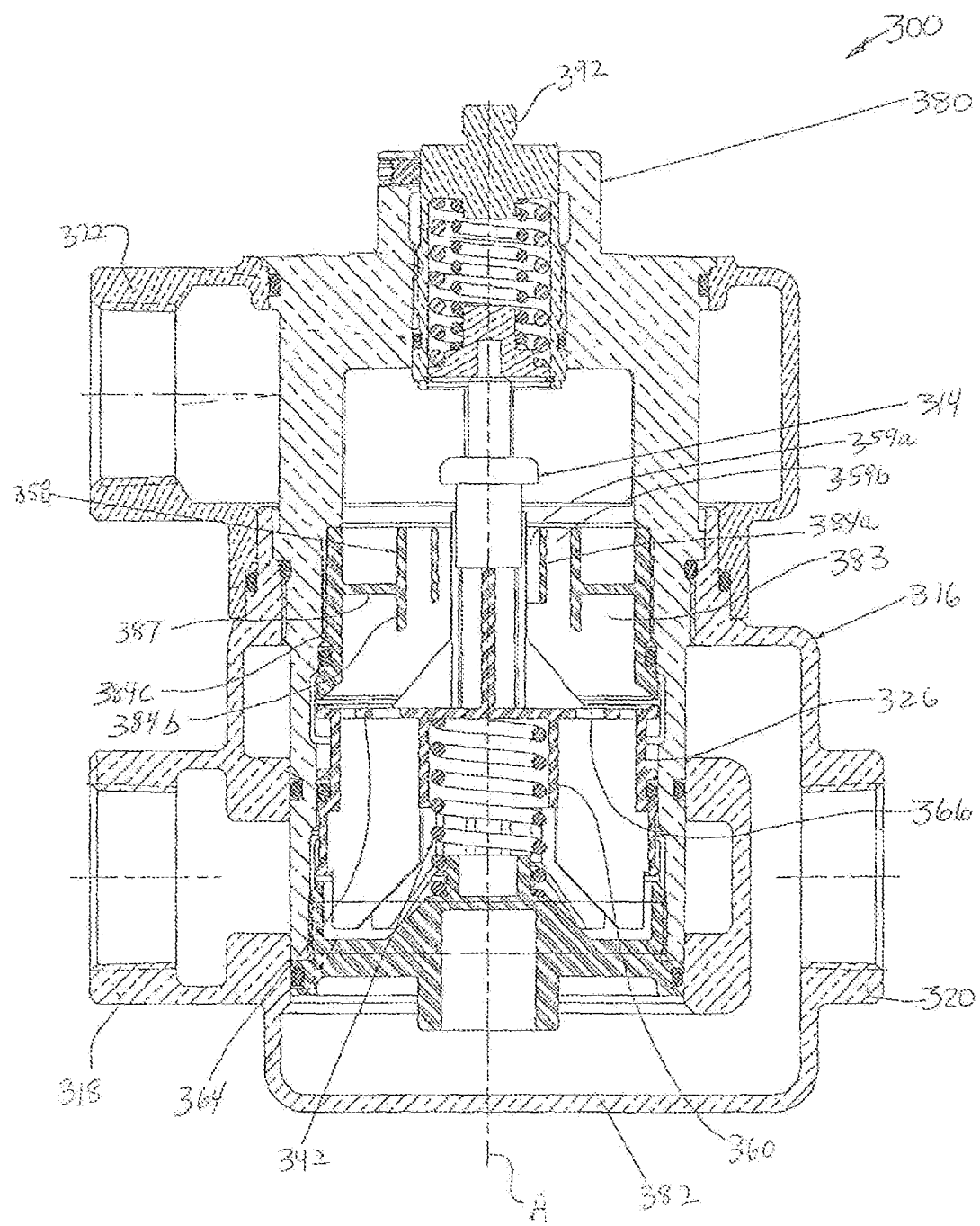
FIG. 20 is an enlarged sectional view of the TMV of FIG. 19 to illustrate the mixing chamber with a plurality of agitating pockets.

Referring to now FIGS. 19 and 20, an exemplary embodiment of still another TMV is shown in perspective and sectional views and referred to generally by the reference numeral 300. The TMV 300 is particularly advantageous for a relatively larger bore valve because the TMV 300 also provides increased mixing of hot and cold flows. As will be appreciated by those of ordinary skill in the pertinent art, the TMV 300 utilizes similar principles to the TMVs 10, 200 described above. Accordingly, like reference numerals preceded by the numeral "3" are used to indicate like elements when possible. The primary difference of the TMV 300 in comparison to the TMVs 10, 200 is the simplified structure of the housing 316.

By having a simplified one casting housing 316, the TMV 300 is relatively easier and cheaper to manufacture that the TMV 200. Despite the outlet 322 being oriented in a single direction as a disadvantage, many applications are well-suited to more cost effective designs.

The present disclosure, therefore, provides a new and improved thermostatic (master) mixing valve. It should be understood, however, that the exemplary embodiment described in this specification has been presented by way of illustration rather than limitation, and various modifications, combinations and substitutions may be effected by those skilled in the art without departure either in spirit or scope from this disclosure in its broader aspects and as set forth in the appended claims. Accordingly, other embodiments are within the scope of the following claims. In addition, the mixing valve disclosed herein, and all elements thereof, are contained within the scope of at least one of the following claims. No elements of the presently disclosed thermostatic mixing valve are meant to be disclaimed.

What is claimed is:

1. A thermostatic mixing valve comprising:
a housing defining first and second inlets for receiving a first and second flow, a mixing chamber in fluid communication with the first and second inlets, an outlet in fluid communication with the mixing chamber, and an axis;
a plunger received within the mixing chamber for providing fluid communication between the first and second inlets, the plunger having a lateral wall defining a plurality of apertures in fluid communication with the first flow;
a funnel adjacent the plunger within the mixing chamber and defining a plurality of agitating pockets in communication with the plurality of apertures for providing mixing of said first and second flow fluid received therein and outputting a mixed flow;
a first and second seat for controlling said first and second flow; the plunger being movable between said first and second seats; and
a thermostatic element located within the housing and extending to the plunger for determining a temperature of the mixed flow and controlling a movement of the plunger in response to said temperature, wherein the mixed flow is provided to the outlet upon achievement of a desired temperature.

2. A thermostatic mixing valve of claim 1, wherein each of the plurality of pockets is substantially identical.

3. A thermostatic mixing valve of claim 1, wherein the each of the plurality of pockets are adjacent to each other and formed about a longitudinal axis of the housing.

4. The thermostatic mixing valve of claim 1, wherein the plurality of pockets are positioned concentrically about the plunger when the plunger is moved in a distal position.

5. The thermostatic mixing valve of claim 4, wherein the plurality of pockets form at least one central annular passage.

6. A thermostatic mixing valve comprising:
a) an elongated housing having a proximal end and a distal end; wherein the elongated housing defines: i) a cold inlet located towards a proximal end for receiving a cold flow; ii) a hot inlet located towards a proximal end for receiving a hot flow; iii) an outlet located towards the distal end; iv) a mixing chamber within the housing towards the proximal end and in fluid communication with the cold inlet, the hot inlet and the outlet, the mixing chamber forming a plurality of pockets for mixing the cold and hot flows and outputting a mixed flow stream; and v) a sensing chamber for receiving the mixed flow stream, the sensing chamber being defined between the outlet and the mixing chamber;
b) a thermostatic element at least partially in the sensing chamber and responsive to a temperature of the mixed flow stream;
c) first seat and second seat in the mixing chamber for forming hot and cold valves on the hot and cold flows, respectively;
d) a plunger coupled to the first and second seats and driven by the thermostatic element in order to vary a position of the hot and cold valves on the hot and cold flows as the plunger moves; and
e) a funnel partially defining the mixing chamber for directing the mixed flow into the sensing chamber, wherein the funnel defines two annular passages between the mixing chamber and the sensing chamber.

7. The thermostatic mixing valve of claim 6, wherein each of the plurality of pockets is substantially identical.

8. The thermostatic mixing valve of claim 6, wherein each of the plurality of pockets are adjacent to each other and formed about the longitudinal axis of the housing.

9. The thermostatic mixing valve of claim 6, wherein the plurality of pockets are positioned concentrically about the plunger when the plunger is moved in a distal position.

10. The thermostatic mixing valve of claim 6, wherein the plurality of pockets form an annular passage having axial partitions.

11. The thermostatic mixing valve of claim 6, wherein a proximal portion of the funnel defines a narrowing trapezoidal shaped space with a wider end proximally located therein.

12. The thermostatic mixing valve of claim 6, wherein a distal portion of the plunger is received within the funnel.

13. The thermostatic mixing valve of claim 1, further comprising coaxial tubes coupled to the funnel to form the annular passages.

14. The thermostatic mixing valve of claim 13, further comprising radial partitions and a lateral wall interconnecting the coaxial tubes and partially defining the plurality of pockets.

15. The thermostatic mixing valve of claim 6, wherein the plunger includes coaxial inner and outer tubes connected by a lateral wall, wherein the lateral wall forms a plurality of passages to allow the hot flow to enter the mixing chamber.

16. The thermostatic mixing valve of claim 15, wherein each passage aligns with a respective pocket.

17. The thermostatic mixing valve of claim 6, wherein the position is adjusted so that a temperature of the mixed flow stream is equal to a predetermined set temperature between 90° and 160° F.

18. A thermostatic mixing valve capable of being set to a desired output temperature between 90° and 160° F. such that if an inlet cold water temperature is under 90° or a hot water inlet temperature is over 160°, the thermostatic mixing valve combines inlet hot and cold water to create an outlet flow that approximately the desired output temperature, the thermostatic mixing valve comprising:
a housing defining an axis, a hot inlet, a cold inlet and an outlet;
a mixing chamber intermediate the inlets and the outlet; and
a funnel at least partially in the mixing chamber for creating and directing a mixed flow, wherein the funnel includes coaxial tubes interconnected by a lateral wall with spaced apart radial partitions to define at least one pocket for mixing the inlet hot and cold water.

19. A thermostatic mixing valve comprising:
a) an elongated housing having a proximal end and a distal end; wherein the elongated housing defines: i) a cold inlet located towards a proximal end for receiving a cold flow; ii) a hot inlet located towards a proximal end for receiving a hot flow; iii) an outlet located towards the distal end; iv) a mixing chamber within the housing towards the proximal end and in fluid communication with the cold inlet, the hot inlet and the outlet, the mixing chamber forming a plurality of pockets for mixing the cold and hot flows and outputting a mixed flow stream; and v) a sensing chamber for receiving the mixed flow stream, the sensing chamber being defined between the outlet and the mixing chamber;

b) a thermostatic element at least partially in the sensing chamber and responsive to a temperature of the mixed flow stream;

c) first seat and second seat in the mixing chamber for forming hot and cold valves on the hot and cold flows, respectively;

d) a plunger coupled to the first and second seats and driven by the thermostatic element in order to vary a position of the hot and cold valves on the hot and cold flows as the plunger moves, wherein the plunger includes coaxial inner and outer tubes connected by a lateral wall, wherein the lateral wall forms a plurality of passages to allow the hot flow to enter the mixing chamber.

20. The thermostatic mixing valve of claim 19, wherein each passage aligns with a respective pocket.

21. A thermostatic mixing valve comprising:

a housing defining an axis, first and second inlets for receiving a first and second flow, a mixing chamber in fluid communication with the first and second inlets, and an outlet in fluid communication with the mixing chamber;

a plunger received within the mixing chamber for providing fluid communication between the first and second inlets;

a funnel adjacent the plunger within the mixing chamber, the funnel having coaxial tubes, radial partitions dividing the tubes, and a lateral wall extending between the coaxial tubes and radial partitions to define a plurality of fixed and rigid agitating pockets for providing mixing of said first and second flow fluid received therein and outputting a mixed flow;

a first and second seat for controlling said first and second flow; the plunger being movable between said first and second seats; and a thermostatic element located within the housing and extending to the plunger for determining a temperature of the mixed flow and controlling a movement of the plunger in response to said temperature, wherein the mixed flow is provided to the outlet upon achievement of a desired temperature.

\* \* \* \* \*